United States Patent
Ly et al.

(10) Patent No.: US 12,381,698 B2
(45) Date of Patent: Aug. 5, 2025

(54) ENHANCING REFERENCE SIGNAL TRANSMISSION IN CARRIER AGGREGATION

(71) Applicant: QUALCOMM Incorporated, San Diego, CA (US)

(72) Inventors: Hung Dinh Ly, San Diego, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 17/827,420

(22) Filed: May 27, 2022

(65) Prior Publication Data

US 2023/0388094 A1 Nov. 30, 2023

(51) Int. Cl.
*H04L 5/00* (2006.01)
*H04W 56/00* (2009.01)
*H04W 72/0453* (2023.01)

(52) U.S. Cl.
CPC ......... *H04L 5/0098* (2013.01); *H04W 56/001* (2013.01); *H04W 72/0453* (2013.01)

(58) Field of Classification Search
CPC . H04L 5/0098; H04L 56/001; H04L 56/0015; H04L 56/002; H04L 56/0025; H04W 56/001; H04W 72/0453
See application file for complete search history.

(56) References Cited

U.S. PATENT DOCUMENTS

| | | | |
|---|---|---|---|
| 2015/0249972 A1* | 9/2015 | You | H04L 5/0053 370/254 |
| 2015/0341877 A1* | 11/2015 | Yi | H04W 56/001 370/350 |
| 2015/0349940 A1 | 12/2015 | Kim et al. | |
| 2016/0014706 A1* | 1/2016 | Vajapeyam | H04W 56/001 370/328 |
| 2019/0044677 A1* | 2/2019 | Ly | H04B 7/088 |
| 2020/0007292 A1* | 1/2020 | Huang | H04W 72/542 |
| 2021/0126677 A1* | 4/2021 | Park | H04L 5/0048 |
| 2021/0167839 A1* | 6/2021 | Zhang | H04L 5/0051 |
| 2021/0250947 A1 | 8/2021 | Ryu et al. | |
| 2021/0320711 A1* | 10/2021 | Lee | H04W 16/28 |
| 2022/0046458 A1* | 2/2022 | Zhu | H04L 5/0048 |

(Continued)

OTHER PUBLICATIONS

International Search Report and Written Opinion—PCT/US2023/022902—ISA/EPO—Oct. 9, 2023.

*Primary Examiner* — Brian T Le
(74) *Attorney, Agent, or Firm* — Holland & Hart LLP

(57) ABSTRACT

Methods, systems, and devices for wireless communications are described. A user equipment (UE) may receive a first message that includes information indicative of an inter-band carrier aggregation configuration that identifies a set of cells for communication by the network node. The UE may receive a synchronization signal on a first cell of the set of cells via a wireless channel having a first set of channel properties. Based on a first set of quasi-colocation (QCL) parameters including the first set of channel properties, the UE may then receive one or more reference signals on the second cell of the set of cells. The UE may receive the one or more reference signals on the second cell based on the synchronization signal of the first cell being a first QCL source indicating use of the first set of QCL parameters to receive the one or more reference signals.

28 Claims, 16 Drawing Sheets

(56) References Cited

U.S. PATENT DOCUMENTS

| | | | |
|---|---|---|---|
| 2022/0141909 A1* | 5/2022 | Wu | H04W 76/18 |
| | | | 370/329 |
| 2022/0264320 A1* | 8/2022 | Landström | H04B 7/0617 |
| 2022/0295457 A1* | 9/2022 | Jang | H04L 5/0053 |

* cited by examiner

ENHANCING REFERENCE SIGNAL TRANSMISSION IN CARRIER AGGREGATION

INTRODUCTION

The following relates to wireless communications, including enhancements for reference signal transmission in carrier aggregation (CA).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communications for communication devices, which may be known as user equipment (UE).

SUMMARY

The described techniques relate to improved methods, systems, devices, and apparatuses that support enhancing reference signal transmission in carrier aggregation (CA). For example, the described techniques support high throughput communications and increased signaling based on increased system traffic, among other factors. This relative increase in signaling, however, may be costly in terms of power consumption from the network perspective. To address increased power consumption, some wireless communications systems may implement reduced signaling techniques such as use of downlink carriers that do not include synchronization signaling. Synchronization signaling, however, may be used to set a quasi-colocation (QCL) relationship (or may be used as a QCL source) for a receiving network node such as a user equipment (UE) to receive signaling on the cell in which it receives the synchronization signaling. Thus, the network node may implement different techniques to identify a QCL source for communicating on the SSB-less carrier.

In some aspects, the network node may receive a synchronization signal on a first cell (e.g., a primary cell) of a set of cells in an inter-band CA deployment, and may use this synchronization signal to determine QCL information for receiving communications on the first cell. The network node may also use this synchronization signal received on the first cell as a QCL source for receiving reference signaling on a second cell (e.g., a secondary cell) in cases where the second cell is SSB-less. For example, the network node may receive the synchronization signal on the first cell via a wireless channel which has a first set of channel properties, and then may receive, based on the first set of QCL parameters, one or more reference signals on the second cell. In such cases, the first set of channel properties may be used to receive reference signaling on the second cell based on the synchronization signal being a QCL source.

A method for wireless communications at a network node is described. The method may include receiving a first message that includes information indicative of an inter-band CA configuration that identifies a set of cells for communication by the network node, receiving a synchronization signal on a first cell of the set of cells via a wireless channel having a first set of channel properties, and receiving, based on a first set of QCL parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals.

A network node for wireless communications is described. The apparatus may include a memory; and at least one processor coupled to the memory. The at least one processor may be configured to receive a first message that includes information indicative of an inter-band carrier aggregation configuration that identifies a set of cells for communication by the network node, receive a synchronization signal on a first cell of the set of cells via a wireless channel having a first set of channel properties, and receive, based on a first set of quasi-colocation (QCL) parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals.

Another network node for wireless communications is described. The network node may include means for receiving a first message that includes information indicative of an inter-band carrier aggregation configuration that identifies a set of cells for communication by the network node, means for receiving a synchronization signal on a first cell of the set of cells via a wireless channel having a first set of channel properties, and means for receiving, based on a first set of quasi-colocation (QCL) parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals.

A non-transitory computer-readable medium having code stored thereon is described. The code may, when executed by a network node, may cause the network node to receive a first message that includes information indicative of an inter-band carrier aggregation configuration that identifies a set of cells for communication by the network node, receive a synchronization signal on a first cell of the set of cells via a wireless channel having a first set of channel properties, and receive, based on a first set of quasi-colocation (QCL) parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals.

Some examples of the method, network nodes, and non-transitory computer-readable medium described herein may further include operations, features, means, or instructions for receiving a first reference signal of the one or more reference signals on the second cell of the set of cells, where the synchronization signal of the first cell may be the first QCL source indicating use of the first set of QCL parameters for receiving the first reference signal and receiving a second reference signal on the second cell of the set of cells in addition to the one or more reference signals, where the first reference signal of the second cell may be a second QCL source indicating use of a second set of QCL parameters for receiving the second reference signal.

Some examples of the method, network nodes, and non-transitory computer-readable medium described herein may further include operations, features, means, or instructions for receiving the first reference signal and the second reference signal of the one or more reference signals based on time and frequency synchronization information indicated by the synchronization signal of the first cell.

In some examples of the method, network nodes, and non-transitory computer-readable medium described herein, the first set of QCL parameters, the second set of QCL parameters, or both, may be associated with one or more Doppler shift parameters, one or more Doppler spread parameters, one or more average delay parameters, one or more delay spread parameters, one or more spatial receiver parameters, or any combination thereof.

Some examples of the method, network nodes, and non-transitory computer-readable medium described herein may further include operations, features, means, or instructions for receiving a first reference signal of the one or more reference signals on the first cell of the set of cells, where the synchronization signal of the first cell may be the first QCL source indicating use of the first set of QCL parameters for receiving the first reference signal and receiving a second reference signal on the second cell of the set of cells in addition to the one or more reference signals, where the first reference signal of the first cell may be a second QCL source indicating use of a second set of QCL parameters for receiving the second reference signal.

Some examples of the method, network nodes, and non-transitory computer-readable medium described herein may further include operations, features, means, or instructions for receiving a first reference signal of the one or more reference signals on the second cell of the set of cells, where the synchronization signal of the first cell may be the first QCL source indicating use of the first set of QCL parameters for receiving the first reference signal.

Some examples of the method, network nodes, and non-transitory computer-readable medium described herein may further include operations, features, means, or instructions for receiving a first reference signal of the one or more reference signals on a third cell of the set of cells, where the synchronization signal of the first cell may be the first QCL source indicating use of the first set of QCL parameters for receiving the first reference signal and receiving one or more communications on the second cell of the set of cells, where the first reference signal of the third cell may be a second QCL source indicating use of a second set of QCL parameters for receiving the one or more communications.

Some examples of the method, network nodes, and non-transitory computer-readable medium described herein may further include operations, features, means, or instructions for receiving a second synchronization signal and a first reference signal of the one or more reference signals on a third cell of the set of cells, where the second synchronization signal of the third cell may be the first QCL source indicating use of the first set of QCL parameters for receiving the first reference signal and receiving one or more communications on the second cell of the set of cells, where the second synchronization signal may be the first QCL source indicating use of the first set of QCL parameters for receiving the one or more communications or where the first reference signal may be a second QCL source indicating use of a second set of QCL parameters for receiving the one or more communications.

Some examples of the method, network nodes, and non-transitory computer-readable medium described herein may further include operations, features, means, or instructions for receiving the one or more communications on the second cell based on time and frequency synchronization information indicated by the first synchronization signal of the first cell and receiving the first reference signal on the third cell based on additional time and frequency synchronization information indicated by the second synchronization signal of the second cell.

DETAILED DESCRIPTION

Figure 1:
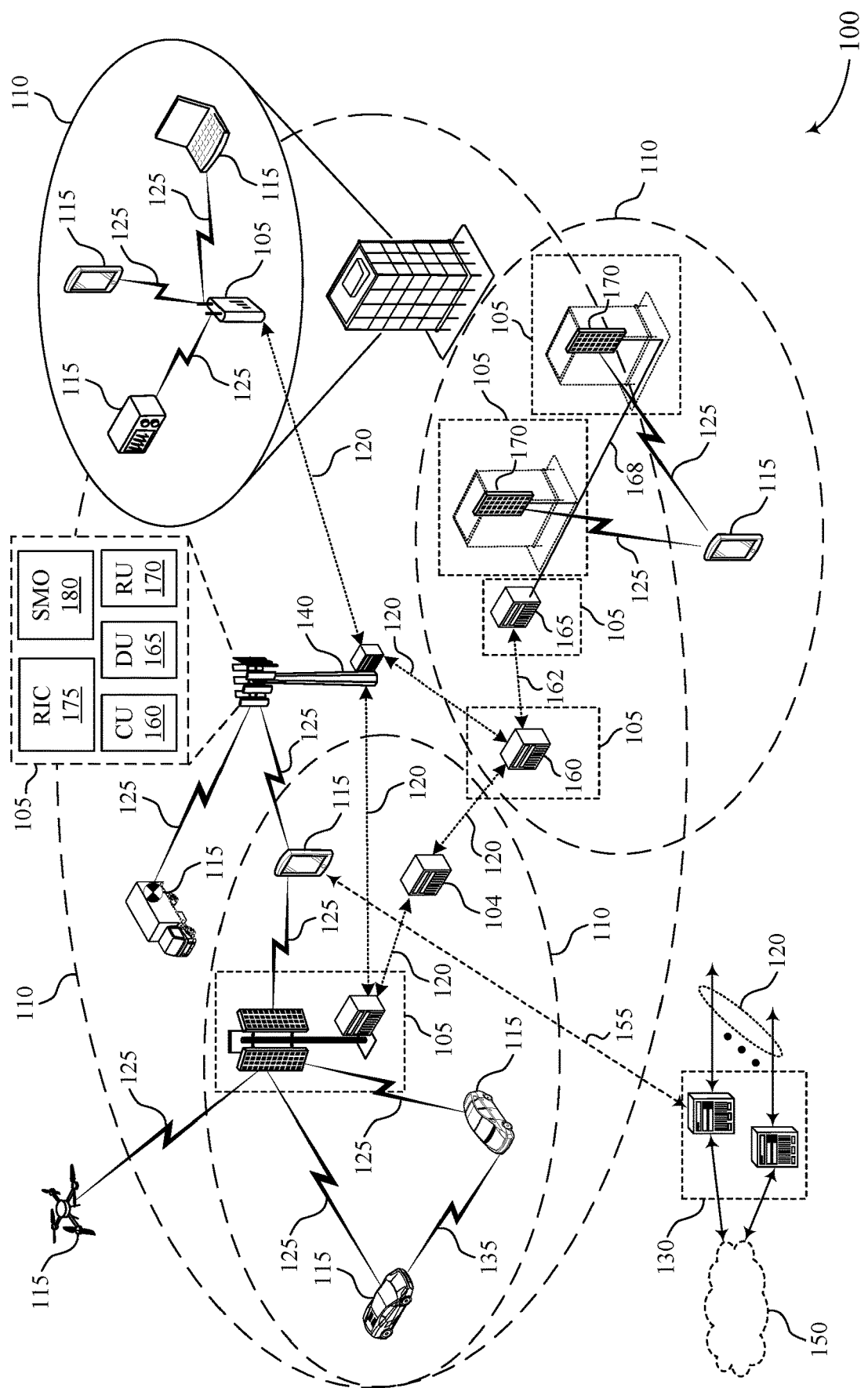
FIGS. 1 and 2 illustrate examples of wireless communications systems that support enhancing reference signal transmission in carrier aggregation (CA) in accordance with one or more aspects of the present disclosure.

Some wireless communications systems may have relatively high operating costs due to increased power consumption for high frequency and extended bandwidth operations, high throughput and low latency communications within the network, and a relative increase in signaling as wireless communications become more widely available. While this relative increase in signaling and throughput improves overall user experience and system efficiency, it may also be costly in terms of power consumption from the network perspective (e.g., the network and network devices may consume excess power due to increased signaling).

To address increased power consumption, some wireless communications systems may implement techniques to reduce excess signaling between a network devices and user equipment (UE). One such technique, for example, for inter-band and intra-band carrier aggregation (CA) deployments, may include the transmission of downlink carriers that do not include synchronization signal blocks (SSBs), or are "SSB-less." For example, a network device may save both power and may reduce resource use by refraining from sending SSBs on at least some of the downlink carriers sent to a network node. Synchronization signaling, however, may be used to set a quasi-colocation (QCL) relationship (or may be used as a QCL source) for the network node to receive reference signaling on the cell in which it receives the synchronization signaling, and may also indicate time and frequency tracking resources for the network node to effectively communicate on the cell. Thus, the network node may implement different techniques to identify a QCL source for receiving communications (e.g., reference signaling such as tracking reference signals (TRSs) such as periodic TRSs (P-TRSs) and aperiodic TRSs (A-TRSs) on the SSB-less carrier. A QCL source is a signal where the properties of the wireless channel on which the signal is received may be applied to reception of a different signal (or signals) over a different channel.

In some implementations, the network node may identify and set a QCL source for receiving signaling on a cell for which it does not receive an associated SSB. In some aspects, the network node may receive an SSB on a first cell (e.g., a primary cell), and may use this SSB to determine QCL information for receiving communications (e.g., reference signaling such as periodic and aperiodic TRSs such as periodic CSI-RSs and aperiodic CSI-RSs) on the first cell. The network node may also use the SSB as a QCL source for receiving reference signaling on a second cell (e.g., a secondary cell) in cases where the second cell is SSB-less. For example, the network node may receive an SSB on the first cell, and may use the SSB as a QCL source for receiving a P-TRS on the second cell, and the P-TRS may be a QCL source for receiving additional reference signaling such as an A-TRS on the second cell.

In some other examples, the network node may receive both an SSB and a first reference signal (e.g., a P-TRS) on the first cell and may use the QCL source of the first reference signal as a QCL source for receiving the second reference signal (e.g., an A-TRS) on the second cell. In a third example, the network node may use the SSB received on the first cell as a QCL source for receiving a second reference signal (e.g., an A-TRS) received on the second cell.

In some other examples, the network node may communicate on the first cell (e.g., a primary cell (PCell)), the second cell (e.g., secondary cell (SCell) 2), and a third cell (e.g., SCell 2). The network node may receive an SSB on the first cell, and may receive a TRS on the third cell but not on the second cell. In such examples, the TRS may be a shared reference signal for the second cell and the third cell, for example, in cases that the network node does not receive an SSB or a TRS on the second cell. The network node may also derive time and frequency tracking information for the second cell based on the shared reference signal.

Aspects of the disclosure are initially described in the context of wireless communications systems. Aspects of the disclosure are further illustrated by and described with reference to apparatus diagrams, system diagrams, cell configuration, a process flow, and flowcharts that relate to enhancing reference signal transmission in CA.

FIG. 1 illustrates an example of a wireless communications system 100 that supports enhancing reference signal transmission in CA in accordance with one or more aspects of the present disclosure. The wireless communications system 100 may include one or more network entities 105, one or more UEs 115, and a core network 130, each of which may be examples of network nodes described herein. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, second network node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE or network node (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE.

In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node.

Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another over a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support enhancing reference signal transmission in CA as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using CA or multi-carrier operation. A UE 115 may be configured with multiple downlink component carriers and one or more uplink component carriers according to a CA configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a CA configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some aspects, the wireless communications system 100 may include network entities 105 or UEs 115 that support concurrent communications via carriers associated with multiple carrier bandwidths. In some aspects, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some aspects, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be able to communicate directly with other UEs 115 over a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some aspects, one or more UEs 115 in such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some aspects, operations in unlicensed bands may be based on a CA configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The various components of wireless communications system 100 may contribute to a total energy consumption for the network. In some aspects, a relative majority of the energy consumption for the wireless communications system is due to radio access network (RAN) operation, for example, based on the power usage for network entities and other network devices. Although high powered operations from the RAN may increase performance metrics such as the data-rate and throughput while reducing latency, techniques that increase energy saving features may also be implemented to support further expansion and efficiency of cellular networks.

In some aspects, a network entity such as a base station may consume energy according to one or more energy consumption models (e.g., for RAN1). In some aspects, the energy consumption models may indicate relative energy consumption for downlink and uplink communications (based on various factors such as power-added (PA) efficiency, number of transceiver units, base station load, etc.), sleep states and the associated transition times, and one or more reference parameters/configurations.

In some aspects, network performance may be evaluated using an evaluation methodology and one or more key performance indicators (KPIs) The evaluation methodology may identify system-level network energy consumption and energy savings gains, and may assess the impact to network and user performance (e.g. spectral efficiency, capacity, user perceived throughput (UPT), latency, handover performance, call drop rate, initial access performance, service level agreement (SLA) assurance related KPIs), energy efficiency, and UE power consumption and complexity. The evaluation methodology may evaluate more than one KPI, and may reuse existing KPIs. Additionally or alternatively, existing KPIs may be updated or new KPIs may be developed for additional evaluation.

In some aspects, wireless communications system 100 may implement a number of techniques (e.g., network-centric techniques, UE-centric techniques, or both) to increase network energy savings in terms of network transmission and reception. Some techniques may include dynamic or semi-static signaling and finer granularity adaptation of communications to increase power savings. Some techniques may be applicable to time, frequency, spatial, and power domains, and may implement feedback from UE and UE assistance information to enhance power savings.

In some aspects, various power saving techniques may apply to a network having an idle to empty network load, or a low to medium network load scenarios, where different loads among carriers and neighbor cells are possible. Power saving techniques may apply to both single-carrier and multi-carrier deployments, to urban micro in frequency range 1 (FR1), TDD massive MIMO, small cell models, FR2 beam-based scenarios, urban and rural macro in FR1, with or without dynamic spectrum sharing, EN-DC or NR-DC macro with FDD PCell, and TDD/Massive MIMO on higher FR1/FR2 frequencies. In some aspects, UEs 115 may continue accessing a network implementing network-centric energy savings techniques and UE-centric energy saving techniques.

In some aspects, the wireless communications system 100 may support SSB-less carriers to increase network side energy savings. For example, the SSB in a first carrier may provide time and frequency synchronization information for a second carrier that does not have an associated SSB (e.g., the second carrier in this case is SSB-less). The network may save power by reducing an amount of signaling used to transmit SSBs, because the network may transmit SSBs on select carriers while refraining from transmitting SSBs on other carriers. In some aspects, the network may support SSB-less carriers in FR1 fragmented bands in which the bands are neighboring (e.g., 700 MHz/800 MHz/900 MHz, 1.8 GHz/2.1 GHz, 1.9 GHz/2 GHz/2.3 GHz), although other bands are possible. In some implementations, the wireless communications system may support SSB-less carriers for inter-band CA scenarios and intra-band CA scenarios. Such SSB-less carriers may reduce cell activation latency (e.g., by facilitating efficient secondary cell (SCell) activation and de-activation according to network traffic), and may increase resource utilization by reducing overhead. In some aspects, inter-band CA with SSB-less carriers may further reduce broadcast overhead for known cells (e.g., Sub-6, 30 kHz, 8 SSBs, TDD w/slot configuration 7D:1S:2U and the S slot 10D:2F:2U).

Some wireless communications systems may have relatively high operating costs due to increased power consumption, high throughput scenarios, and a relative increase in signaling. This relative increase in signaling, however, may be costly in terms of power consumption from the network perspective (e.g., for radio access network (RAN) devices and other network devices). To address increased power consumption, some wireless communications systems may implement reduced signaling techniques such as implementing transmission of downlink carriers that do not include SSBs. For example, a network device 105 may save both power and may reduce resource use by refraining from sending SSBs on at least some of the downlink carriers sent to a receiving first network node 115 such as UE 115. Synchronization signaling, however, may be used to set a QCL relationship (or may be used as a QCL source) for the first network node 115 to receive reference signaling on the cell in which it receives the synchronization signaling, and may also indicate time and frequency tracking resources for the first network node 115. Thus, the first network node 115 may implement different techniques to identify a QCL source for communicating on the SSB-less carrier.

In some aspects, the first network node 115 may receive an SSB on a first cell (e.g., a primary cell), and may use this SSB to determine QCL information for receiving communications on the first cell. The first network node 115 may also use this SSB received on the first cell as a QCL source for receiving reference signaling on a second cell (e.g., a secondary cell) in cases where the second cell is SSB-less. For example, the first network node 115 may receive an SSB on the first cell, and may use the SSB as a QCL source for receiving a P-TRS on the second cell, and the P-TRS may be a QCL source for receiving additional reference signaling such as an A-TRS on the second cell.

In some other examples, the first network node 115 may receive both an SSB and a first reference signal (e.g., a P-TRS) on the first cell and may use the QCL source of the first reference signal as a QCL source for receiving the second reference signal (e.g., an A-TRS) on the second cell. In a third example, the first network node 115 may use the SSB received on the first cell as a QCL source for receiving a second reference signal (e.g., an A-TRS) received on the second cell.

In some other examples, the first network node 115 may communicate on the first cell (e.g., PCell), the second cell, and a third cell (e.g., SCell 2). The first network node 115 may receive an SSB on the first cell, and may receive a TRS on the third cell but not on the second cell. In such examples, the TRS may be a shared reference signal for the second cell and the third cell, for example, in cases that the network node does not receive an SSB or a TRS on the second cell. The network node may also derive time and frequency tracking information for the second cell based on the shared reference signal.

Figure 2:
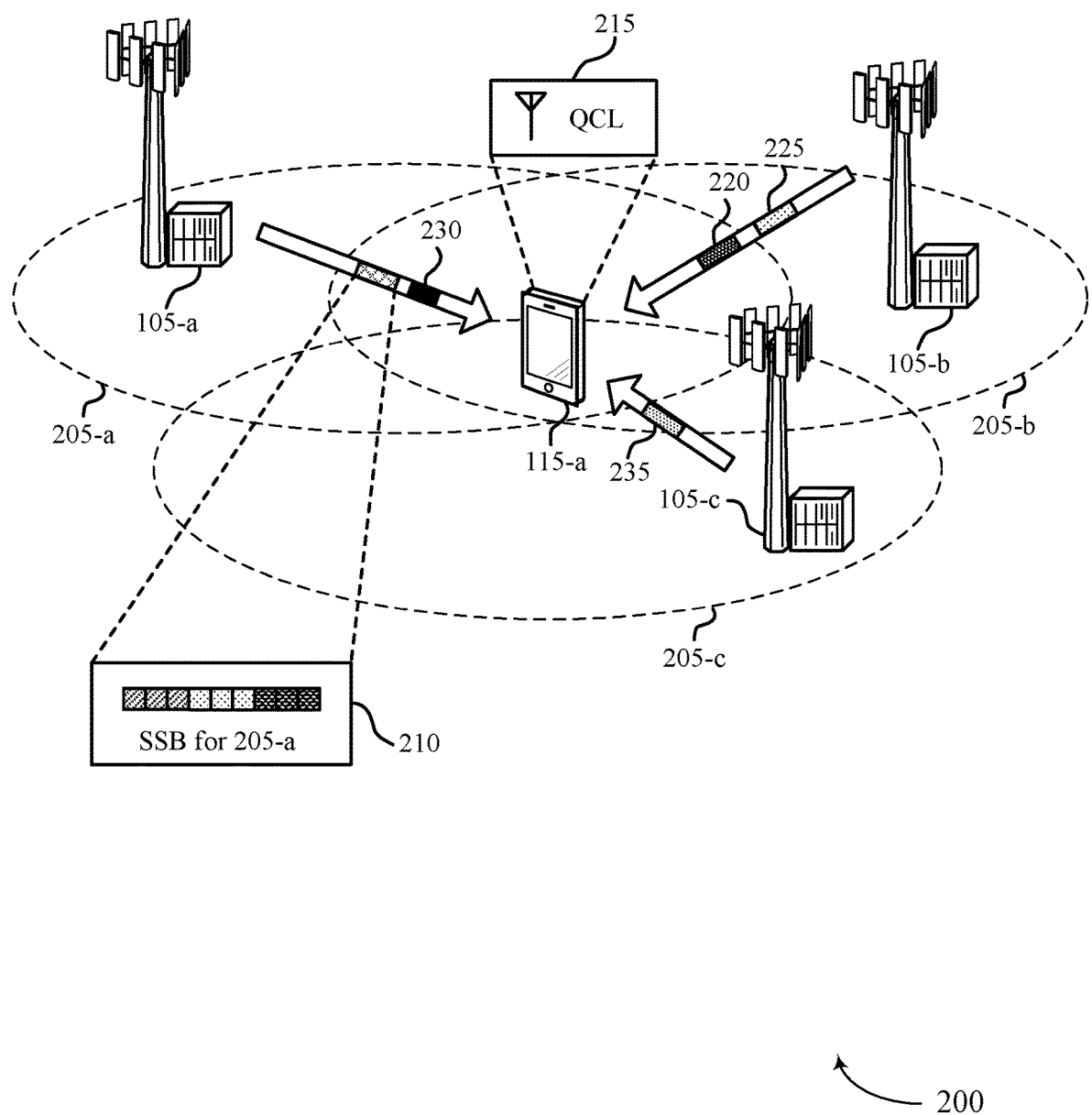

FIG. 2 illustrates an example of a wireless communications system 200 that supports enhancing reference signal transmission in CA in accordance with one or more aspects of the present disclosure. For example, wireless communications system 200 may illustrate communications between a first network node 115-a and network entities 105-a, 105-b, and 105-c, which may be examples of corresponding devices described herein.

Wireless communications system 200 may support high frequency communications on extended bandwidths to increase system throughput. A relative increase in signaling and throughput improves overall user experience and system efficiency, but it may also be costly in terms of power consumption from the perspective of the network (e.g., network entities 105 may consume excess power due to increased signaling). Some wireless communications systems may implement techniques to address excessive power consumption, including techniques to reduce excess signaling between a second network node 105 and a first network node 115. One such technique, for example, for inter-band and intra-band CA deployments, may include the transmission of downlink carriers that do not include SSBs. For example, a second network node 105 may save both power and resources by refraining from sending SSBs on at least some of the downlink carriers sent to the first network node 115-a. SSB-less carriers in an inter-band CA deployment may also increase the efficiency of secondary cell (SCell) activation while reducing broadcast overhead to further increase energy savings. Synchronization signaling such as that associated with SSBs, however, may be used to set a QCL relationship (or is used as a QCL source) for the first network node 115 to be able to receive reference signaling on that cell, and may indicate time and frequency tracking resources for the network node to effectively communicate on the cell. Thus, in cases where the first network node 115 does not receive an SSB on a carrier, the first network node 115 may implement different techniques to identify a QCL source for receiving communications (e.g., reference signaling such as TRSs) on the SSB-less carrier.

In some implementations, the first network node 115-a may identify and set a QCL source for receiving signaling on a cell for which it does not receive an associated SSB. The first network node 115-a may communicate with network entities 105-a, 105-b, and 105-c on respective cells (e.g., carriers) 205-a, 205-b, and 205-c. In a first example, the first network node 115-a may receive an SSB 210 on a first cell 205-a (e.g., a primary cell), and may use this SSB to determine QCL information for receiving communications (e.g., reference signaling such as periodic and aperiodic TRSs) on the first cell 205-a. The network node may also use the SSB 210 as a QCL source 215 for receiving reference signaling on a second cell 205-b (e.g., a secondary cell) in cases where the second cell 205-b is SSB-less. A QCL source is a signal where the properties of the wireless channel on which the signal is received (e.g., SSB 210 on cell 205-a) may be applied to reception of a different signal (or signals) over a different channel (e.g., reference signal 220 on cell 205-b). For example, the first network node 115-a may receive the SSB 210 on the first cell 205-a, and may use the SSB 210 as a QCL source 215 for receiving a P-TRS 230 on the second cell 205-b, and the P-TRS may be a QCL source 215 for receiving additional reference signaling such as an aperiodic CSI-RS or an A-TRS 225 on the second cell 205-b.

In a second example, the network node may receive both an SSB 210 and a first reference signal 230 (e.g., a P-TRS 230) on the first cell 205-a and may use the QCL source 215 of the first reference signal 230 as a QCL source 215 for receiving the second reference signal 225 (e.g., an A-TRS 225) on the second cell 205-b. In a third example, the first network node 115-a may use the SSB 210 received on the first cell 205-a as a QCL source 215 for receiving a second reference signal 225 (e.g., an A-TRS 225) received on the second cell 205-b.

In some other examples, the network node may communicate on the first cell 205-a (e.g., PCell), the second cell 205-b (e.g., SCell 1), and a third cell (e.g., SCell 2) in an inter-band CA deployment. The first network node 115-a may receive the SSB 210 on the first cell 205-a, and may receive a TRS 235 on the third cell 205-c. The network node may not receive an SSB on the third cell. In some aspects, the TRS 235 may be a shared reference signal for the second cell 205-b and the third cell 205-c, for example, in cases that the first network node 115-a does not receive an SSB or a TRS on the second cell 205-b. The first network node 115-a may derive time and frequency tracking information for the second cell 205-b based on the shared reference signal 235.

In some other examples, the network node may communicate on the first cell 205-a (e.g., PCell), the second cell 205-b (e.g., SCell 1), and a third cell (e.g., SCell 2) in an inter-band CA deployment. The first network node 115-a may receive the SSB 210 on the first cell 205-a, and may receive an SSB and a TRS 235 on the third cell 205-c. In some aspects, the TRS 235 may be a shared reference signal for the third cell 205-c and the second cell 205-b, for example, in cases that the first network node 115-a does not receive an SSB or a TRS on the second cell 205-b. The first network node 115-a may derive time and frequency tracking information for the second cell 205-b based on the TRS 235 and the SSB received on the third cell 205-c.

Figure 3:
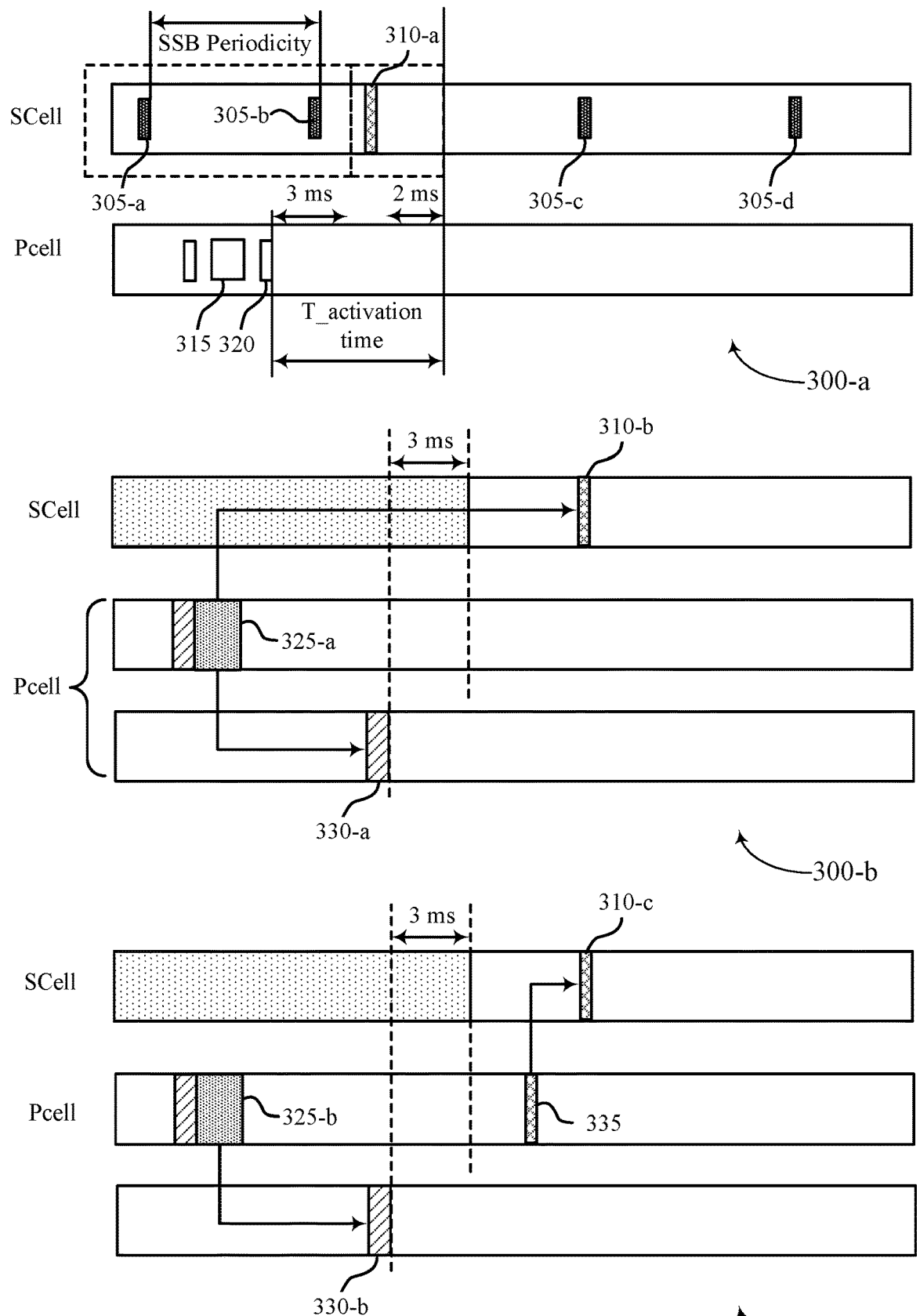
FIG. 3 illustrates example cell activation configurations that support enhancing reference signal transmission in CA in accordance with one or more aspects of the present disclosure.

FIG. 3 illustrate example cell activation configurations 300-a, 300-b, and 300-c that support enhancing reference signal transmission in CA in accordance with one or more aspects of the present disclosure. In some aspects, the cell activation configurations 300-a, 300-b, and 300-c may be implemented at or by one or more devices described herein. For example, the cell activation configurations 300-a, 300-b, and 300-c may be implemented at or by a network node such as a UE or a network entity, or both.

Cell configuration 300-a shows a first SCell activation configuration including a first cell (e.g., PCell) and a second cell (e.g., SCell). A network node may periodically receive SSBs 305 on the SCell, which may include time and frequency synchronization information, or other information for communicating on the SCell. In some aspects, the network node may receive an activation command 315 and an acknowledgement 320 for activating the SCell during an activation time period (e.g., T_activation time). In some aspects, the network node may wait until the next periodic SSB occasion (e.g., SSB 305-c) that occurs after the activation command 315 to activate the SCell and perform synchronization measurements. In some other cases, however, the network node may activate the SCell and perform synchronization measurements using the TRS 310 which occurs after the activation command 315 and before the next SSB occasion 305-c, which may reduce latency. Similar to the SSB, the TRS 310 may be used for AGC measurements and time and frequency measurement tracking, and activation of the SCell using the TRS may be applicable to both intra-band and inter-band CA deployments.

Cell configuration 300-b shows a second SCell activation configuration which shows an example in which a TRS is triggered via a MAC-CE. For example, at 325-a, the network node may receive a PDSCH which includes a MAC-CE that triggers SCell activation and indicates the TRS 310-b on the SCell. The network node may acknowledge the receipt of the MAC-CE on the PCell using a HARQ-ACK message 330-a, and may activate the SCell based on the received MAC-CE. The network node may then use the TRS 310-b for performing measurements on the activated SCell.

Cell configuration 300-c shows a second SCell activation configuration which shows an example in which a TRS is triggered via DCI. For example, at 325-b, the network node may receive a PDSCH which includes a MAC-CE that triggers SCell activation and indicates the TRS 310-c on the SCell. The network node may acknowledge the receipt of the MAC-CE on the PCell using a HARQ-ACK message

330-b. The network node may then receive a DCI 335 in a PDCCH which triggers the TRS 310-c (e.g., an A-TRS) on the secondary cell. The network node may then use the TRS 310-c for performing measurements on the activated SCell.

In some aspects, the reference signal may be an A-TRS that uses a P-TRS in the to-be-activated SCell as a QCL source. For example, the network node may receive the P-TRS on the SCell using a first QCL relationship, and may use the same QCL relationship to receive the A-TRS. In some aspects, the SSB for a cell or carrier (e.g., the SSB for the SCell), is may be used to set the QCL relationship (or is used as a QCL source) for the network node to be able to receive reference signaling on that cell. In some cases, however, a carrier may not have an SSB (e.g., the carrier may be SSB-less) and thus the network node may implement a number of different techniques to account for channel estimation, frequency offset error estimation and synchronization procedures on a cell that does not have an SSB.

Figure 4:
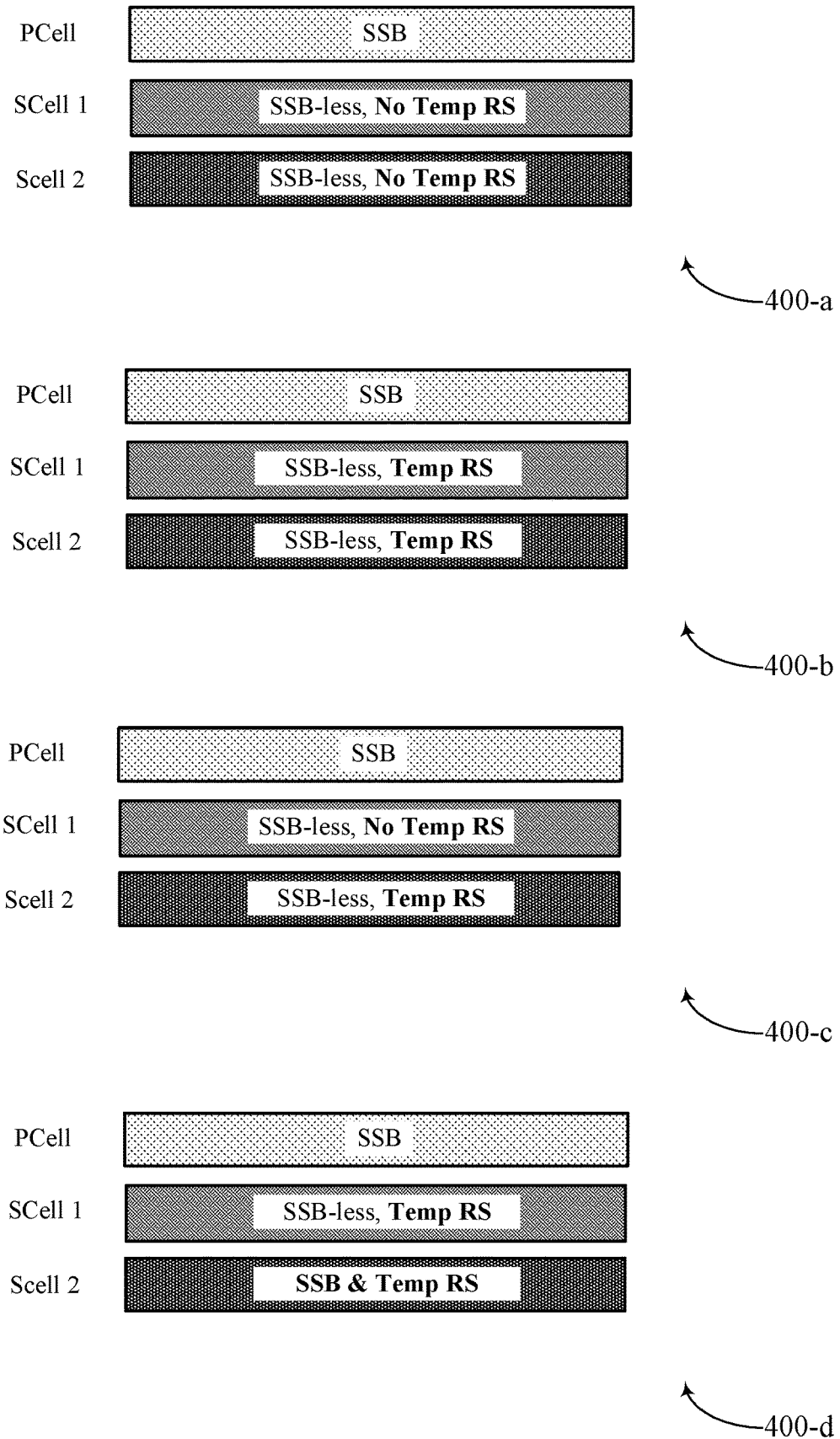
FIGS. 4 through 6 illustrate example cell configurations that support enhancing reference signal transmission in CA in accordance with one or more aspects of the present disclosure.

FIG. 4 illustrates example cell configurations 400-a, 400-b, 400-c, and 400-d that support enhancing reference signal transmission in CA in accordance with one or more aspects of the present disclosure. In some aspects, the cell configurations 400-a, 400-b, 400-c, and 400-d may be implemented at or by one or more devices described herein. For example, the cell configurations 400-a, 400-b, 400-c, and 400-d may be implemented at or by a network node such as a UE or a network entity, or both.

In some aspects, the cell configurations may support inter-band CA for carriers that do not have an associated SSB (e.g., SSB-less carriers). To support inter-band CA, the network may also specify a maximum receive timing difference (MRTD) target that is relatively smaller than implementations for carriers that include SSBs. The relatively higher MRTD target may increase the relative frame timing alignment at the receiver, and may correspond to a maximum relative receive timing difference the network node may be capable of handling. In some aspects, the MRTD target for inter-band CA may be within a threshold amount of the MRTD target for intra-band CAs. In some aspects, the MRTD may be affected by whether a TRS is included on the SSB-less carrier (e.g., the MRTD target may be increased based on the time and frequency tracking and AGC setting associated with the TRS, and in cases that there is a relatively large power difference between the serving cell and the to-be-activated SCell). In some aspects, the network node may support a relative MRTD between slot timing of all pairs of carriers to be aggregated at the network node receiver, and the MRTD may be different for different carrier frequencies. For example, for inter-band aggregated carriers operating in FR1, the network node may support MRTD of up to 33 μs. For FR2, the network node may support an MRTD of up to 8 μs, and for frequencies between FR1 and FR2 the network node may support an MRTD of up to 25 μs. For intra-band aggregated carriers operating in FR1, the network node may support MRTD of up to 3 μs, and for FR2 the network node may support MRTD of up to 0.26 μs.

Additionally or alternatively, to support inter-band CA for carriers that do not have an associated SSB (e.g., SSB-less carriers), the SSB-less carrier may be collocated with the carrier that has an associated SSB such that the carrier with the SSB may provide time and frequency synchronization information for the SSB-less carrier. Such colocation may also support transmission of the TRS since time and frequency information for the SSB-less carrier may be identified based on the carrier that has an SSB.

A first cell configuration 400-a shows a PCell which has an SSB, with both a first SCell (e.g., SCell 1) and a second SCell (e.g., SCell 2) lacking both SSBs and TRSs. In such cases, the Pcell, the first SCell, and the second SCell may be co-located with MRTD similar to that for intra-band CA deployments.

A second cell configuration 400-b shows a PCell which has an SSB, with both a first SCell (e.g., SCell 1) and a second SCell (e.g., SCell 2) lacking SSBs, and both the first SCell and the second SCell containing TRSs. In such cases, the Pcell, the first SCell, and the second SCell may be co-located, and the MRTD between the PCell and the SCells may be similar to or smaller than that for intra-band CA deployments.

A third cell configuration 400-c shows a PCell which has an SSB, with both a first SCell (e.g., SCell 1) and a second SCell (e.g., SCell 2) lacking SSBs. In some such cases, the first SCell may lack a TRS and the second SCell may include a TRS. In such cases, the Pcell, the first SCell, and the second SCell may be co-located, and the MRTD between the PCell and the SCells may be similar to or smaller than that for intra-band CA deployments.

A fourth cell configuration 400-d shows a PCell which has an SSB, with a first SCell (e.g., SCell 1) lacking an SSB, and a second SCell (e.g., SCell 2) including an SSB. In some such cases, both the first SCell and the second SCell may include TRSs. In such cases, the Pcell, the first SCell, and the second SCell may be co-located, and the MRTD between the PCell and the SCells may be similar to or smaller than that for intra-band CA deployments.

In some aspects, the network may save both power and resources by refraining from sending SSBs on some of the downlink cells (e.g., the first SCell and the second SCell) sent to the network node. The SSB for a cell or carrier, however, may be used to set a QCL relationship for the network node to receive reference signaling on that cell. Thus, for implementations in which SSB-less carriers are used, the network node may implement a number of techniques for identifying a QCL source for receiving signaling (such as reference signaling) on the SSB-less carrier.

Figure 5:
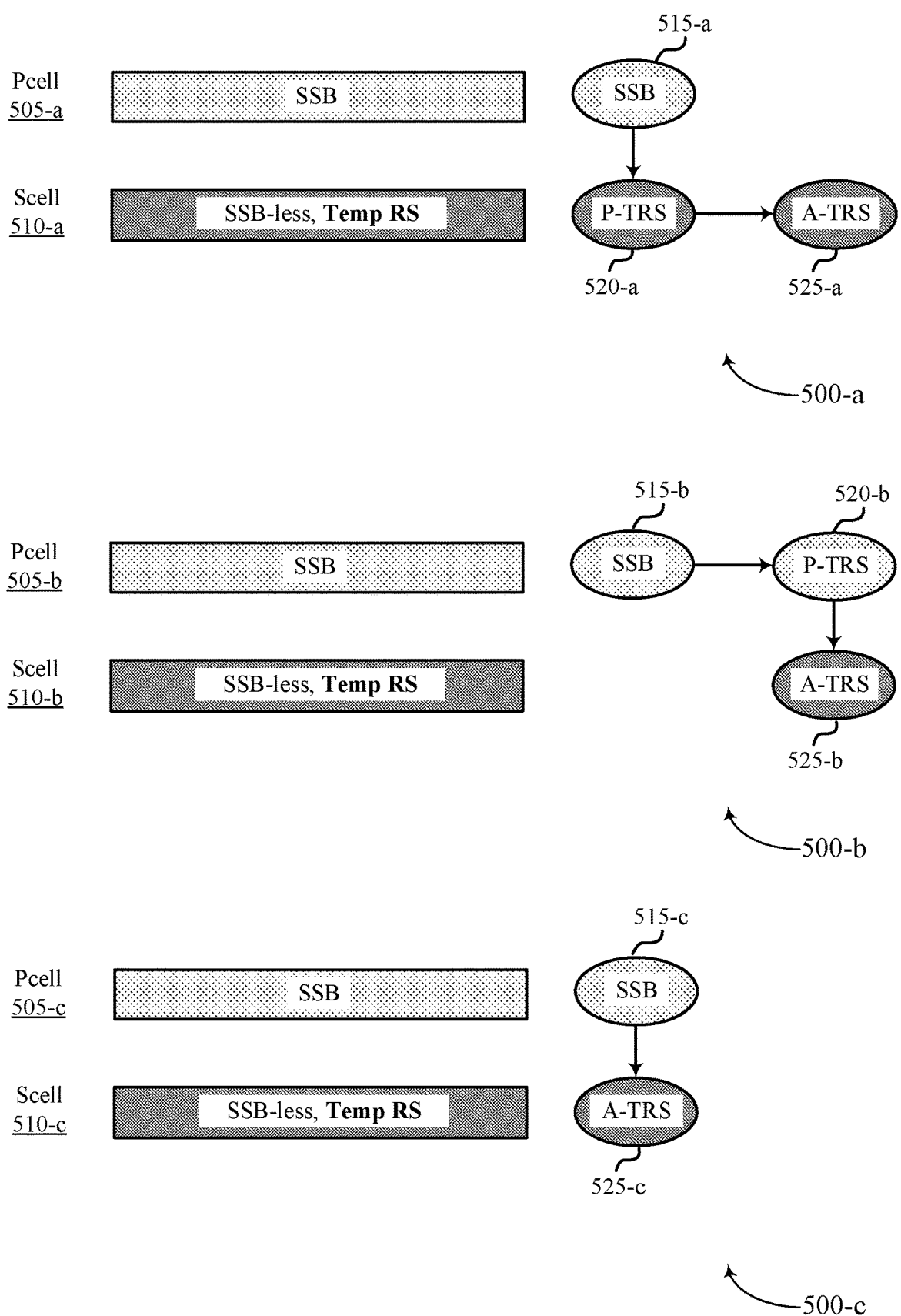

FIG. 5 illustrates an example cell configurations 500-a, 500-b, and 500-c that support enhancing reference signal transmission in CA in accordance with one or more aspects of the present disclosure. In some aspects, the cell configurations 500-a, 500-b, and 500-c may be implemented at or by one or more devices described herein. For example, the cell configurations 500-a, 500-b, and 500-c may be implemented at or by a network node such as a UE or a network entity, or both.

In some aspects, the cell configurations 500-a, 500-b, and 500-c may support inter-band CA for carriers that do not have an associated SSB (e.g., SSB-less carriers). In some aspects, the network node may determine a QCL source for receiving communications on the SSB-less carrier or cell. In such examples, the QCL source may be a signal where the properties of the wireless channel on which the signal is received may be applied to reception of a different signal over a different channel.

A first cell configuration 500-a shows a first cell (e.g., PCell 505-a) and a second cell (SCell 510-a) which may inter-band carrier aggregated. The network node may receive an SSB 515-a on the PCell 505-a, and may not receive an SSB on the SCell 510-a. In some such cases, the network node may receive a periodic TRS (e.g., P-TRS 520-a) on the SCell 510-a using the received SSB 515-a on the PCell 505-a as a QCL source for receiving the P-TRS 520-a. Additionally or alternatively, the network node may determine time and frequency synchronization information for the SCell 510-a based off of the SSB 515-a received on the PCell 505-*a*. The network node may then receive an A-TRS (e.g., A-TRS 525-*a*) using the P-TRS 520-*a* as a QCL source for receiving the A-TRS 525-*a*. For example, the SSB 515-*a* may be the QCL source for the P-TRS 520-*a*, and the P-TRS 520-*a* may be the QCL source for the A-TRS 525-*a*. The SCell 510-*a* may be activated based on receiving the P-TRS 520-*a* and the A-TRS 525-*a*.

A second cell configuration 500-*b* shows a first cell (e.g., PCell 505-*b*) and a second cell (SCell 510-*b*) which may inter-band carrier aggregated. The network node may receive an SSB 515-*b* on the PCell 505-*b*, and may not receive an SSB on the SCell 510-*b*. In some such cases, the network node may receive a P-TRS (e.g., P-TRS 520-*b*) on the PCell 505-*b* using the received SSB 515-*b* as a QCL source. The network node may then receive an A-TRS (e.g., A-TRS 525-*b*) using the P-TRS 520-*b* as a QCL source for receiving the A-TRS 525-*b*. For example, the SSB 515-*b* may be the QCL source for the P-TRS 520-*b*, and the P-TRS 520-*b* (received on the PCell 505-*b*) may be the QCL source for the A-TRS 525-*b* (received on the SCell 510-*b*). The SCell 510-*b* may be activated based on receiving the P-TRS 520-*b* and the A-TRS 525-*b*. Additionally or alternatively, the network node may determine time and frequency synchronization information for the SCell 510-*b* based on the P-TRS 520-*b* received on the PCell 505-*b*.

A third cell configuration 500-*c* shows a first cell (e.g., PCell 505-*c*) and a second cell (SCell 510-*c*) which may inter-band carrier aggregated. The network node may receive an SSB 515-*c* on the PCell 505-*c*, and may not receive an SSB on the SCell 510-*c*. In some such cases, the network node may receive an A-TRS (e.g., A-TRS 520-*c*) on the SCell 510-*c* using the received SSB 515-*c* as a QCL source. For example, the SSB 515-*c* received on the PCell 505-*c* may be the QCL source for the A-TRS 520-*c* received on the SCell 510-*c*. Additionally or alternatively, the network node may determine time and frequency synchronization information for the SCell 510-*c* based on the SSB 515-*c* received on the PCell 505-*c*.

Figure 6:
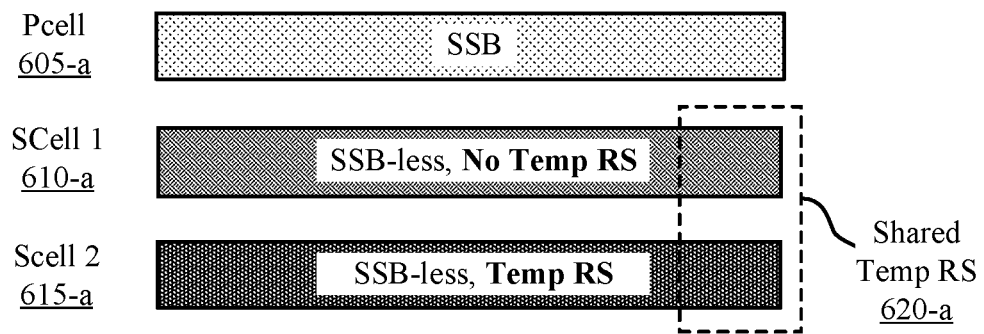
Figure 6:
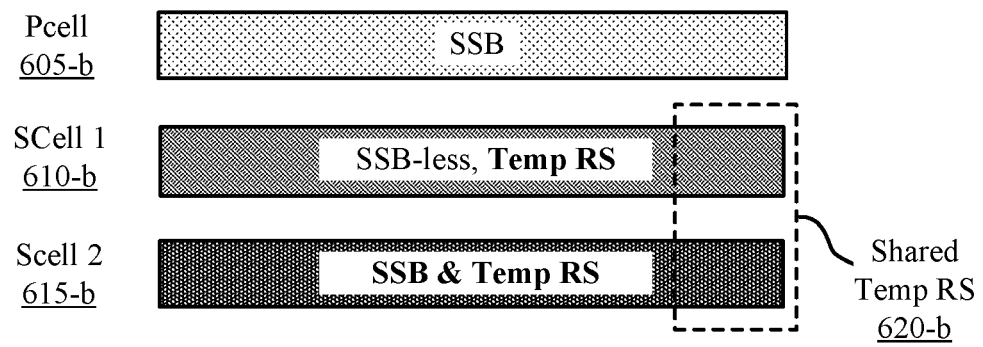

FIG. 6 illustrates example cell configurations 600-*a* and 600-*b* that support enhancing reference signal transmission in CA in accordance with one or more aspects of the present disclosure. In some aspects, the cell configurations 600-*a* and 600-*b* may be implemented at or by one or more devices described herein. For example, the cell configurations 600-*a* and 600-*b* may be implemented at or by a network node such as a UE or a network entity, or both.

In some aspects, the cell configurations 600-*a* and 600-*b* may be part of a same band and support inter-band CA for carriers that do not have an associated SSB (e.g., SSB-less carriers). In some aspects, the network node may determine a QCL source for receiving communications on the SSB-less carrier or cell. In such examples, the QCL source may be a signal where the properties of the wireless channel on which the signal is received may be applied to reception of a different signal over a different channel.

A first cell configuration 600-*a* shows a first cell (e.g., PCell 605-*a*), a first secondary cell (SCell 610-*a*), and a second secondary cell (SCell 615-*a*) which may inter-band carrier aggregated. The network node may receive an SSB on the PCell 605-*a*, and may not receive SSBs on the SCell 610-*a* and 615-*a*. In some such cases, the network node may receive a TRS 620-*a* on the SCell 615-*a*, and may not receive a TRS 620-*a* on the SCell 610-*a*. In some aspects where the network node receives a TRS 620-*a* on one carrier or cell, but not on another carrier or cell, the TRS 620-*a* received may be shared between both carriers or cells such that the TRS 620-*a* on one cell provides time and frequency tracking information for another cell. For example, the TRS 620-*a* received on SCell 615-*a* may be shared between the SCell 615-*a* and 620-*a*, and may provide time and frequency tracking information for the SCell 620-*a*. Additionally or alternatively, the network node may receive the TRS 620-*a* using the SSB received on PCell 605-*a* as a QCL source for receiving the TRS on the SCell 615-*a*. In some aspects, the network node may receive communications on the SCell 610-*a* using the TRS 620-*a* as a QCL source for receiving the communications on the SCell 610-*a*.

A second cell configuration 600-*a* shows a first cell (e.g., PCell 605-*b*), a first secondary cell (SCell 610-*b*), and a second secondary cell (SCell 615-*b*) which may inter-band carrier aggregated. The network node may receive an SSB on the PCell 605-*b* and may receive an SSB on the SCell 615-*b*, and may not receive an SSB on the SCell 610-*b*. In some such cases, the network node may receive a TRS 620-*b* on the SCell 615-*b*, and may not receive a TRS 620-*a* on the SCell 610-*b*. In some aspects where the network node receives a TRS 620-*b* on one carrier or cell but not on another carrier or cell, the received TRS 620-*b* may be shared between both carriers or cells such that the TRS 620-*b* on one cell provides time and frequency tracking information for another cell. For example, the TRS 620-*b* received on SCell 615-*b* may be shared between the SCell 615-*b* and 610-*b*, and may provide time and frequency tracking information for the SCell 610-*b* (in addition to or in place of time frequency information provided by the SSB received on SCell 615-*b*). Additionally or alternatively, the network node may receive the TRS 620-*b* using the SSB received on SCell 615-*b* as a QCL source. In some aspects, the network node may receive communications on the SCell 610-*a* using the TRS 620-*b* as a QCL source.

In some cases, the shared TRSs 620-*a* and 620-*b* may reduce signaling overhead (e.g., the second network node may skip sending TRSs on each carrier, and may send the TRSs on select carriers), which may reduce resource usage. Additionally or alternatively, the second network node may increase the amount of time spend in idle or sleep mode based on the reduced SSB signaling, which may reduce overall network power consumption.

Figure 7:
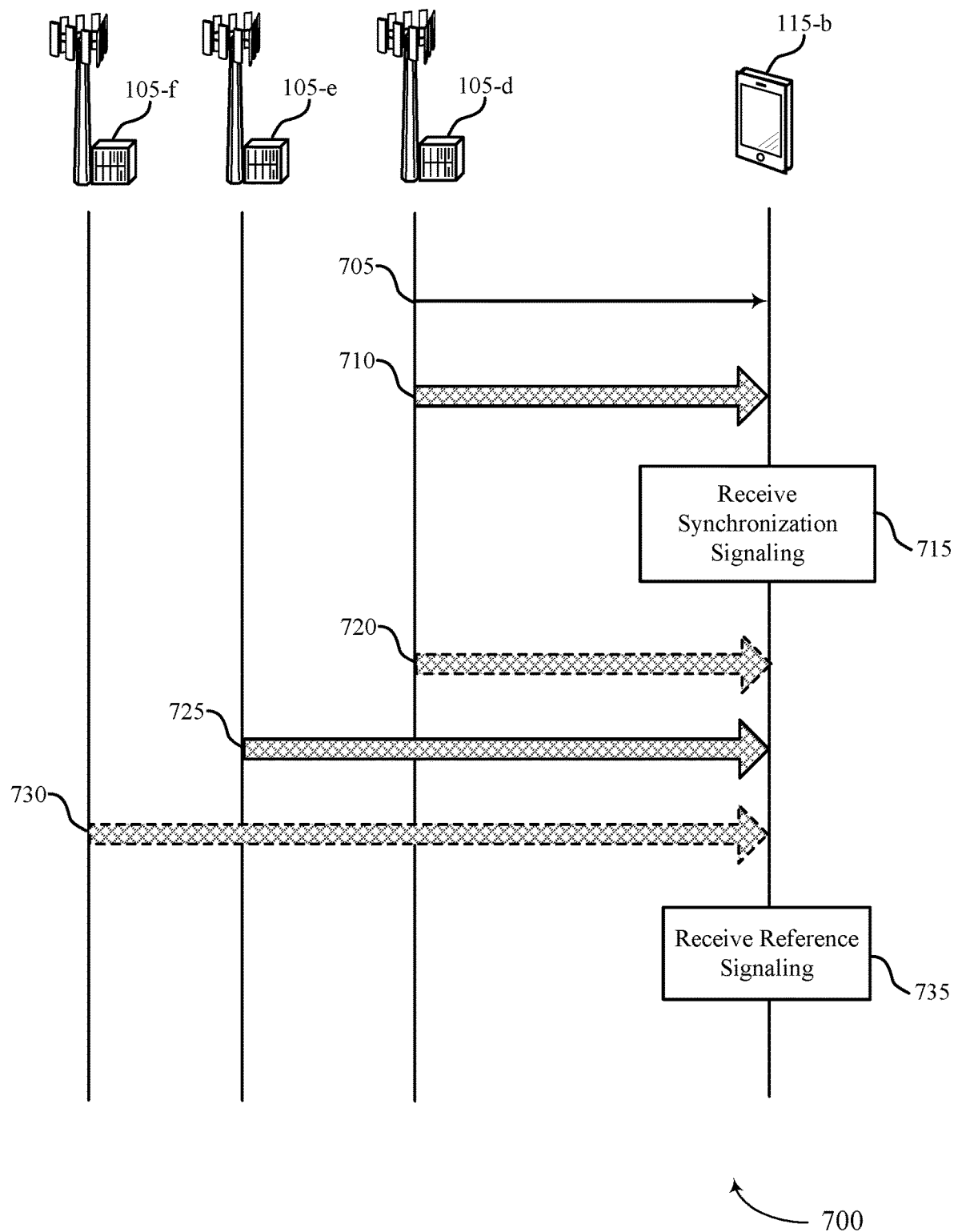
FIG. 7 illustrates an example of a process flow that supports enhancing reference signal transmission in CA in accordance with one or more aspects of the present disclosure.

FIG. 7 illustrates an example of a process flow 700 that supports enhancing reference signal transmission in CA in accordance with one or more aspects of the present disclosure. Process flow 700 may illustrate communications between network nodes, which may be examples of devices such as first network node 115 and network entities 105 as described herein. For example, process flow may be an example of a communications flow between a first network node 115-*b* and network entities 105-*d*, 105-*e*, and 105-*f* In the following description of the process flow 700, the operations between the devices may be communicated in a different order than the example order shown, or the operations performed by the devices may be performed in different orders or at different times. Some operations may also be omitted from the process flow 700, and other operations may be added to the process flow 700.

At 705 the first network node 115-*b* may receive a first message that includes information indicative of an inter-band CA configuration that identifies a set of cells (e.g., served by network entities 105-*d*, 105-*e*, and 105-*f*, respectively) for communication by the first network node 115-*a*.

At 715, the first network node 115-*b* may receive a synchronization signal on a first cell of the set of cells via a wireless channel 710 having a first set of channel properties. In some aspects, the first cell and the second cell are aligned in time in accordance with a threshold receive timing difference. In some aspects, the first cell and the second cell include a primary cell and a secondary cell that are co-located and that occupy different frequency bands of the inter-band CA configuration.

In some aspects, at 720, the first network node 115-b may receive a first reference signal of the one or more reference signals on the first cell, where the synchronization signal of the first cell is the first QCL for the first reference signal. Then, at 725, the network node may receive a second reference signal on the second cell in addition to the one or more reference signals, wherein the first reference signal of the first cell is a second QCL source indicating the use of a second set of QCL parameters for receiving the second reference signal. In some examples, the one or more reference signals include TRSs such as a periodic CSI-RS for tracking, and aperiodic CSI-RS for tracking, a CSI-RS, or any combination thereof.

In some aspects, at 725, the first network node 115-b may receive a first reference signal of the one or more reference signals on the second cell of the set of cells, where the synchronization signal of the first cell is a first QCL source for the first reference signal. The network node may then receive a second reference signal on the second cell of the set of cells in addition to the one or more reference signals, where the first reference signal of the second cell is a second QCL source indicating the use of a second set of QCL parameters for receiving the second reference signal. In some aspects, the first network node 115-b may receive the first reference signal and the second reference signal based on time and frequency synchronization information indicated by the synchronization signal of the first cell. In some aspects, the first QCL source or the second QCL source is a source of one or more Doppler shift parameters, one or more Doppler spread parameters, one or more average delay parameters, one or more delay spread parameters, one or more spatial receiver parameters, or any combination thereof.

At 730, the first network node 115-b may receive a first reference signal of the one or more reference signals on a third cell, where the synchronization signal of the first cell is the first QCL source indicating the use of the first set of QCL parameters for receiving the first reference signal. The first network node 115-b may then receive one or more communications on the second cell of the set of cells, where the first reference signal of the third cell is a second QCL source indicating use of a second set of QCL parameters for receiving the one or more communications. In some aspects, the first reference signal on the third cell may be a shared reference signal between the second cell and the third cell.

In some aspects, the first network node 115-b may receive a second synchronization signal and a first reference signal on the third cell, where the second synchronization signal of the third cell is the first QCL source for first reference signal. The first network node 115-b may then receive one or more communications on the second cell, where the second synchronization signal is the first QCL source indicating use of the first set of QCL parameters the one or more communications, or the first reference signal is a second QCL source indicating use of a second set of QCL parameters for receiving the one or more communications. In some aspects, the first reference signal on the third cell may be a shared reference signal between the second cell and the third cell.

At 735, the first network node 115-b may receive one or more reference signals on the second cell of the set of cells based on the first set of QCL parameters including the first set of channel properties, where the first set of channel properties are used based on the synchronization signal of the first cell being a first QCL source indicating use of the first set of QCL parameters to receive the one or more reference signals.

Figure 8:
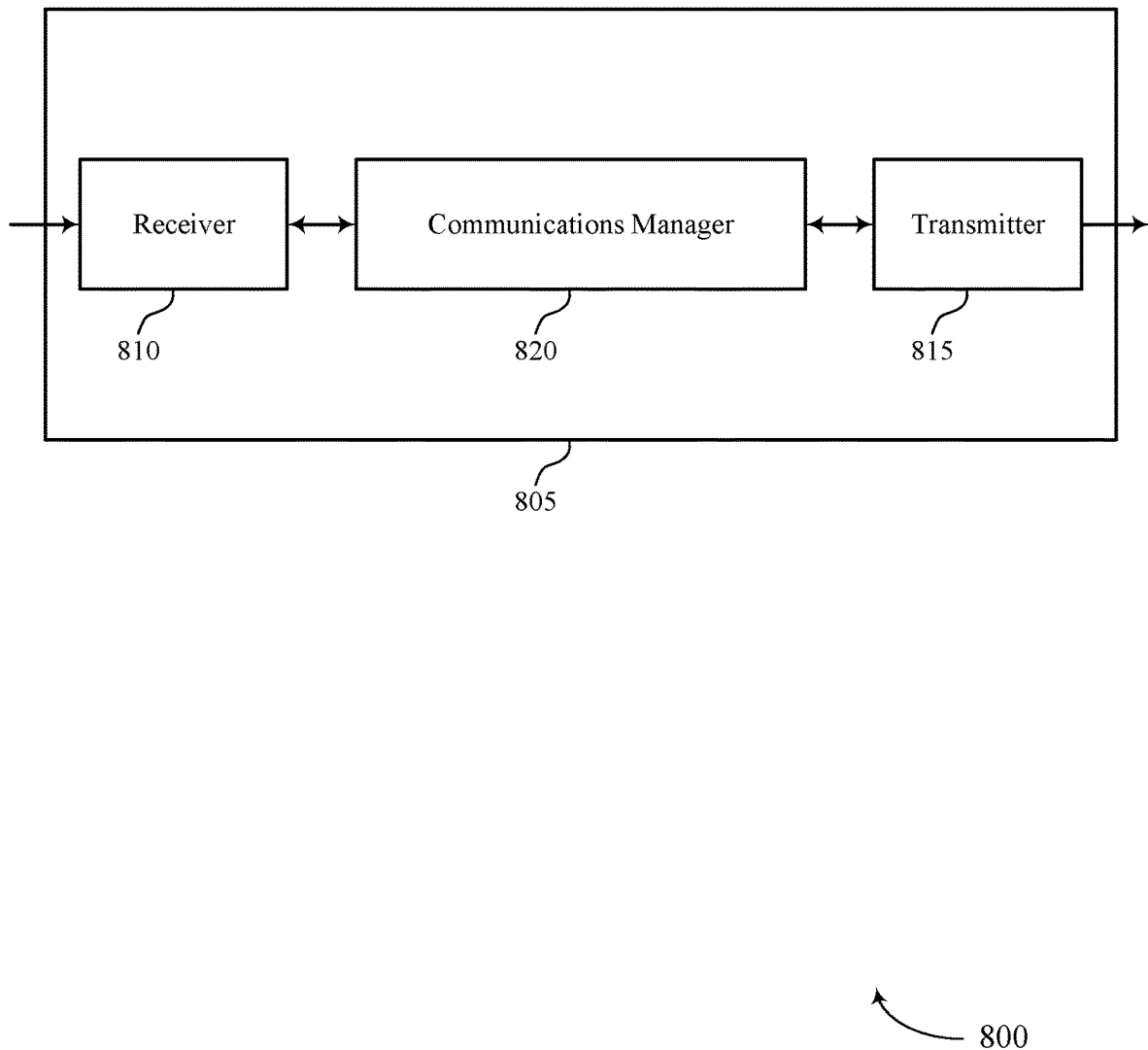
FIGS. 8 and 9 show block diagrams of devices that support enhancing reference signal transmission in CA in accordance with one or more aspects of the present disclosure.

FIG. 8 shows a block diagram 800 of a device 805 that supports enhancing reference signal transmission in CA in accordance with one or more aspects of the present disclosure. The device 805 may be an example of aspects of a network node such as a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to enhancing reference signal transmission in CA). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to enhancing reference signal transmission in CA). In some aspects, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of enhancing reference signal transmission in CA as described herein. For example, the communications manager 820, the receiver 810, the transmitter 815, or various combinations or components thereof may support a method for performing one or more of the functions described herein.

In some aspects, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network node in accordance with examples as disclosed herein. For example, the communications manager 820 may be configured as or otherwise support a means for receiving a first message that includes information indicative of an inter-band CA configuration that identifies a set of cells for communication by the network node. The communications manager 820 may be configured as or otherwise support a means for receiving a synchronization signal on a first cell of the set of cells via a wireless channel having a first set of channel properties. The communications manager 820 may be configured as or otherwise support a means for receiving, based on the first set of QCL parameters, one or more reference signals on a second cell of the set of cells, the first set of QCL parameters used based on the synchronization signal of the first cell being a first QCL source indicating use of the first set of QCL parameters to receive the one or more reference signals.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced power consumption due to reduced signaling, and more efficient time and frequency synchronization procedures using relatively less network signaling.

Figure 9:
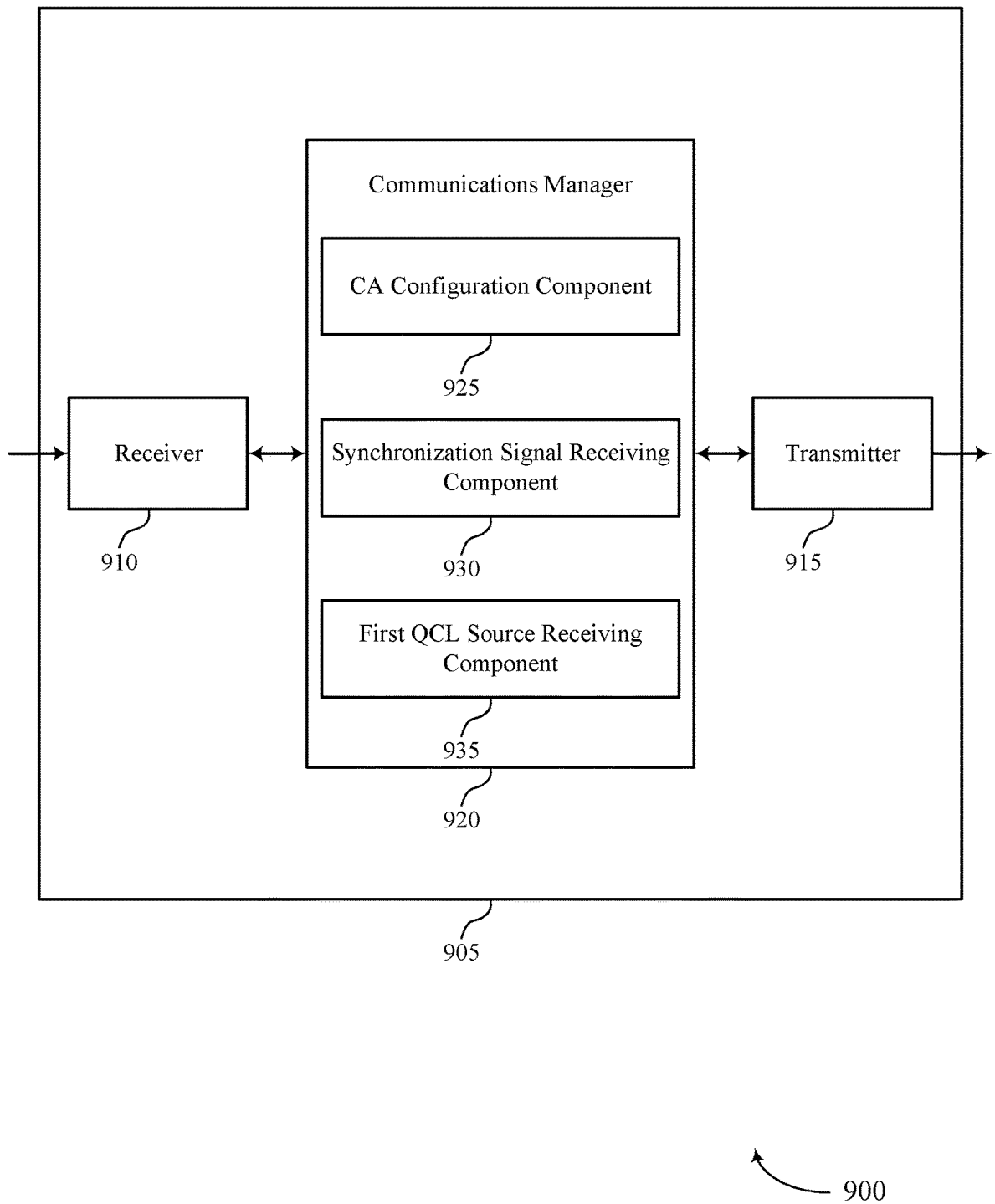

FIG. 9 shows a block diagram 900 of a device 905 that supports enhancing reference signal transmission in CA in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to enhancing reference signal transmission in CA). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to enhancing reference signal transmission in CA). In some aspects, the transmitter 915 may be co-located with a receiver 910 in a transceiver module. The transmitter 915 may utilize a single antenna or a set of multiple antennas.

The device 905, or various components thereof, may be an example of means for performing various aspects of enhancing reference signal transmission in CA as described herein. For example, the communications manager 920 may include a CA configuration component 925, a synchronization signal receiving component 930, a first QCL source receiving component 935, or any combination thereof. The communications manager 920 may be an example of aspects of a communications manager 820 as described herein. In some aspects, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network node in accordance with examples as disclosed herein. The CA configuration component 925 may be configured as or otherwise support a means for receiving a first message that includes information indicative of an inter-band CA configuration that identifies a set of cells for communication by the network node. The synchronization signal receiving component 930 may be configured as or otherwise support a means for receiving a synchronization signal on a first cell of the set of cells via a wireless channel having a first set of channel properties. The first QCL source receiving component 935 may be configured as or otherwise support a means for receiving, based on the first set of QCL parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals.

Figure 10:
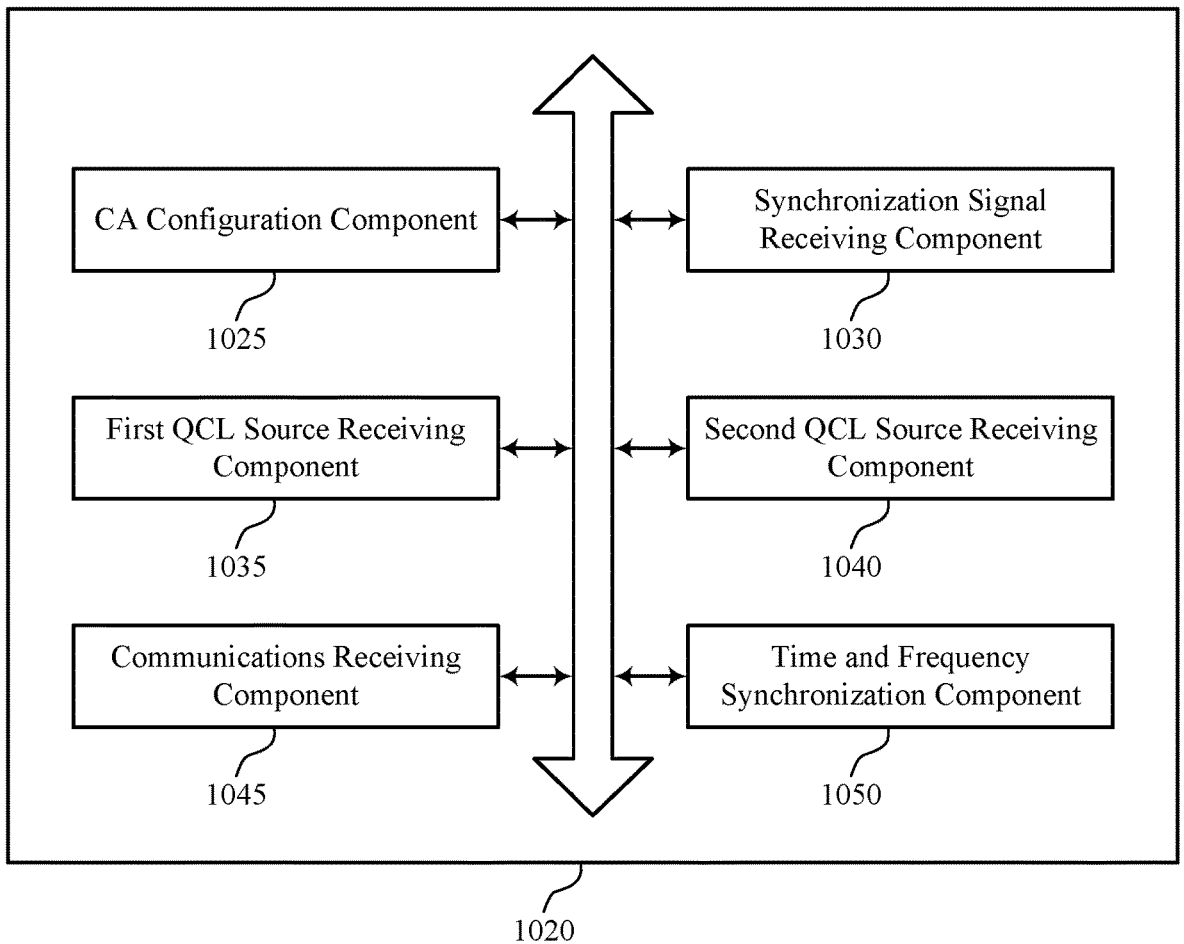
FIG. 10 shows a block diagram of a communications manager that supports enhancing reference signal transmission in CA in accordance with one or more aspects of the present disclosure.

FIG. 10 shows a block diagram 1000 of a communications manager 1020 that supports enhancing reference signal transmission in CA in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of enhancing reference signal transmission in CA as described herein. For example, the communications manager 1020 may include a CA configuration component 1025, a synchronization signal receiving component 1030, a first QCL source receiving component 1035, a second QCL source receiving component 1040, a communications receiving component 1045, a time and frequency synchronization component 1050, or any combination thereof. Each of these components may communicate, directly or indirectly, with one another (e.g., via one or more buses).

The communications manager 1020 may support wireless communications at a network node in accordance with examples as disclosed herein. The CA configuration component 1025 may be configured as or otherwise support a means for receiving a first message that includes information indicative of an inter-band CA configuration that identifies a set of cells for communication by the network node. The synchronization signal receiving component 1030 may be configured as or otherwise support a means for receiving a synchronization signal on a first cell of the set of cells via a wireless channel having a first set of channel properties. The first QCL source receiving component 1035 may be configured as or otherwise support a means for receiving, based on a first set of QCL parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals.

In some aspects, the first QCL source receiving component 1035 may be configured as or otherwise support a means for receiving a first reference signal of the one or more reference signals on the second cell of the set of cells, where the synchronization signal of the first cell is the first QCL source indicating the use of the first set of QCL parameters for receiving the first reference signal. In some aspects, the second QCL source receiving component 1040 may be configured as or otherwise support a means for receiving a second reference signal on the second cell of the set of cells in addition to the one or more reference signals, where the first reference signal of the second cell is a second QCL source indicating the use of a second set of QCL parameters for receiving the second reference signal.

In some aspects, the time and frequency synchronization component 1050 may be configured as or otherwise support a means for receiving the first reference signal and the second reference signal of the one or more reference signals based on time and frequency synchronization information indicated by the synchronization signal of the first cell.

In some aspects, the first set of QCL parameters, the second set of QCL parameters, or both, are associated with one or more Doppler shift parameters, one or more Doppler spread parameters, one or more average delay parameters, one or more delay spread parameters, one or more spatial receiver parameters, or any combination thereof.

In some aspects, the first QCL source receiving component 1035 may be configured as or otherwise support a means for receiving a first reference signal of the one or more reference signals on the first cell of the set of cells, where the synchronization signal of the first cell is the first QCL source indicating the use of the first set of QCL parameters for receiving the first reference signal. In some aspects, the second QCL source receiving component 1040 may be configured as or otherwise support a means for receiving a second reference signal on the second cell of the set of cells in addition to the one or more reference signals, where the first reference signal of the first cell is a second QCL source indicating the use of a second set of QCL parameters for receiving the second reference signal.

In some aspects, the time and frequency synchronization component 1050 may be configured as or otherwise support a means for receiving the first reference signal and the second reference signal of the one or more reference signals on the second cell based on time and frequency synchronization information indicated by the synchronization signal of the first cell.

In some aspects, the first set of QCL parameters, the second set of QCL parameters, or both, are associated with one or more Doppler shift parameters, one or more Doppler spread parameters, one or more average delay parameters, one or more delay spread parameters, one or more spatial receiver parameters, or any combination thereof.

In some aspects, the first QCL source receiving component 1035 may be configured as or otherwise support a means for receiving a first reference signal of the one or more reference signals on the second cell of the set of cells, where the synchronization signal of the first cell is the first QCL source indicating the use of the first set of QCL parameters for receiving the first reference signal.

In some aspects, the time and frequency synchronization component 1050 may be configured as or otherwise support a means for receiving the first reference signal of the one or more reference signals on the second cell based on time and frequency synchronization information indicated by the synchronization signal of the first cell.

In some aspects, the first QCL source is a source of one or more Doppler shift parameters, one or more Doppler spread parameters, one or more average delay parameters, one or more delay spread parameters, one or more spatial receiver parameters, or any combination thereof.

In some aspects, the first QCL source receiving component 1035 may be configured as or otherwise support a means for receiving a first reference signal of the one or more reference signals on a third cell of the set of cells, where the synchronization signal of the first cell is the first QCL source indicating the use of the first set of QCL parameters for receiving the first reference signal. In some aspects, the second QCL source receiving component 1040 may be configured as or otherwise support a means for receiving one or more communications on the second cell of the set of cells, where the first reference signal of the third cell is a second QCL source indicating use of the first set of QCL parameters for receiving the one or more communications.

In some aspects, the time and frequency synchronization component 1050 may be configured as or otherwise support a means for receiving the first reference signal on the third cell and the one or more communications on the second cell based on time and frequency synchronization information indicated by the synchronization signal of the first cell.

In some aspects, the first set of QCL parameters, the second set of QCL parameters, or both, are associated with one or more Doppler shift parameters, one or more Doppler spread parameters, one or more average delay parameters, one or more delay spread parameters, one or more spatial receiver parameters, or any combination thereof.

In some aspects, the first QCL source receiving component 1035 may be configured as or otherwise support a means for receiving a second synchronization signal and a first reference signal of the one or more reference signals on a third cell of the set of cells, where the second synchronization signal of the third cell is the first QCL source for first reference signal. In some aspects, the communications receiving component 1045 may be configured as or otherwise support a means for receiving one or more communications on the second cell of the set of cells, where the second synchronization signal is the first QCL source indicating use of the first set of QCL parameters for receiving the one or more communications or where the first reference signal is a second QCL source indicating use of a second set of QCL parameters for receiving the one or more communications.

In some aspects, the communications receiving component 1045 may be configured as or otherwise support a means for receiving the one or more communications on the second cell based on time and frequency synchronization information indicated by the first synchronization signal of the first cell. In some aspects, the time and frequency synchronization component 1050 may be configured as or otherwise support a means for receiving the first reference signal on the third cell based on additional time and frequency synchronization information indicated by the second synchronization signal of the second cell.

In some aspects, the first set of QCL parameters, the second set of QCL parameters, or both, are associated with one or more Doppler shift parameters, one or more Doppler spread parameters, one or more average delay parameters, one or more delay spread parameters, one or more average delay parameters, one or more delay spread parameters, one or more spatial receiver parameters, or any combination thereof.

In some aspects, the first cell and the second cell are aligned in time in accordance with a threshold receive timing difference.

In some aspects, the first cell and the second cell include a combination of a primary cell and a secondary cell that are co-located and that occupy different frequency bands of the inter-band CA configuration.

In some aspects, the one or more reference signals include a P-TRS, an A-TRS, or both. In some aspects, the one or more reference signals include channel state information reference signals.

Figure 11:
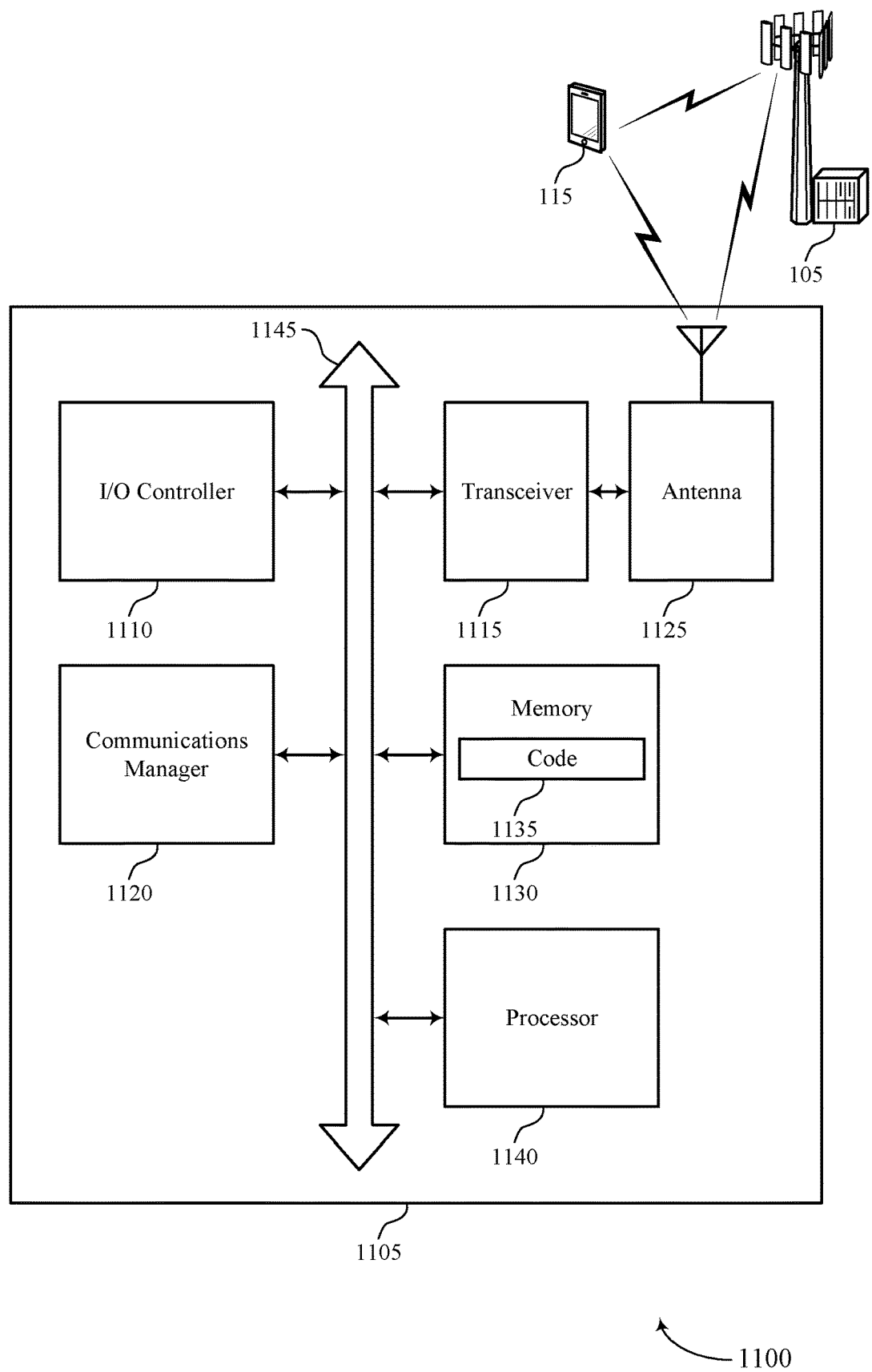
FIG. 11 shows a diagram of a system including a device that supports enhancing reference signal transmission in CA in accordance with one or more aspects of the present disclosure.

FIG. 11 shows a diagram of a system 1100 including a device 1105 that supports enhancing reference signal transmission in CA in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting enhancing reference signal transmission in CA). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a network node in accordance with examples as disclosed herein. For example, the communications manager 1120 may be configured as or otherwise support a means for receiving a first message that includes information indicative of an inter-band CA configuration that identifies a set of cells for communication by the network node. The communications manager 1120 may be configured as or otherwise support a means for receiving a synchronization signal on a first cell of the set of cells via a wireless channel having a first set of channel properties. The communications manager 1120 may be configured as or otherwise support a means for receiving, based on a first set of QCL parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals.

By including or configuring the communications manager 1120 in accordance with examples as described herein, the device 1105 may support techniques for improved communication reliability based on synchronization, reduced power consumption due to reduced signaling, and more efficient time and frequency synchronization procedures using relatively less network signaling, more efficient utilization of communication resources, longer battery life due to reduced power consumption, and reduced network burden.

In some aspects, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of enhancing reference signal transmission in CA as described herein, or the processor 1140 and the memory 1130 may be otherwise configured to perform or support such operations.

Figure 12:
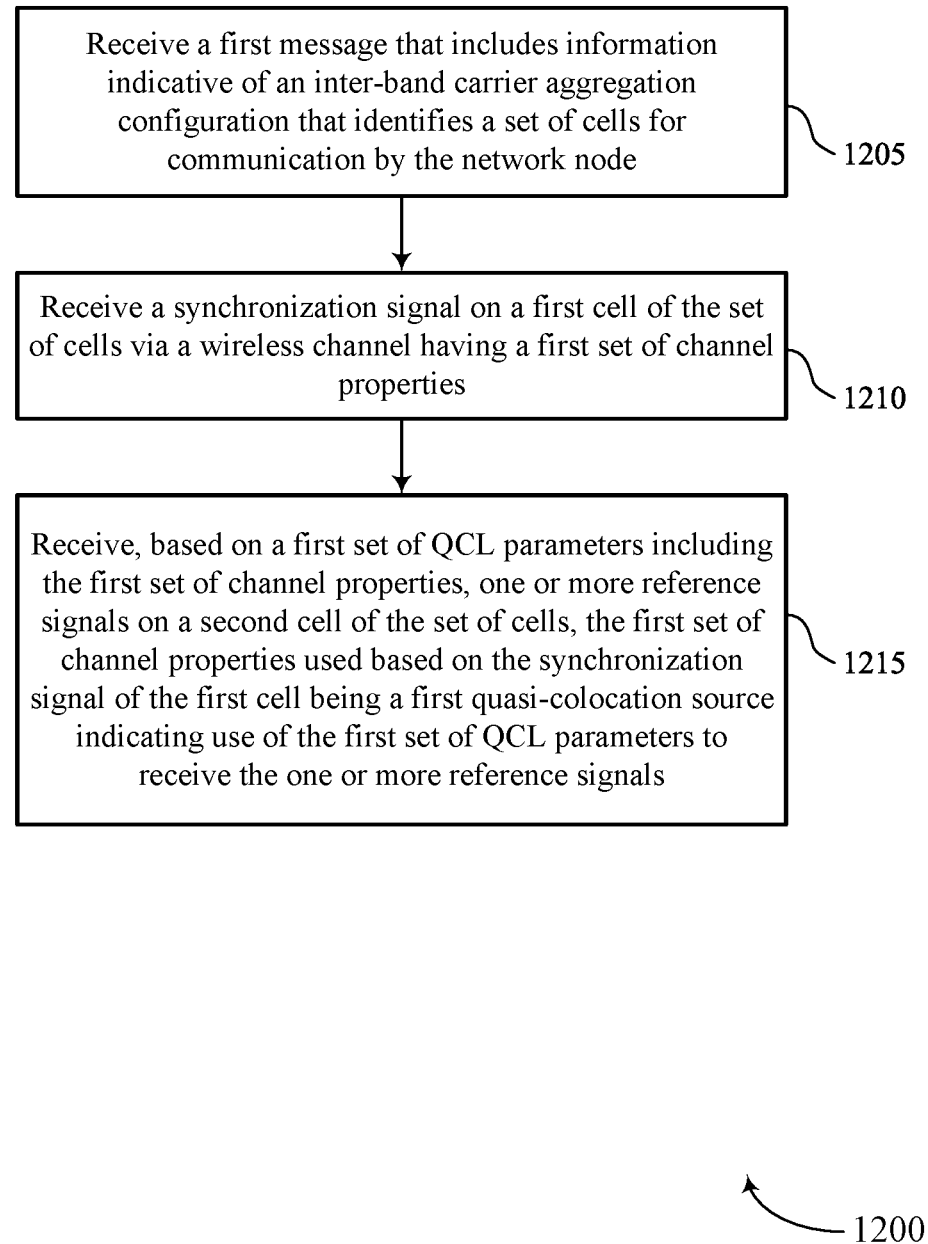
FIGS. 12 through 16 show flowcharts illustrating methods that support enhancing reference signal transmission in CA in accordance with one or more aspects of the present disclosure.

FIG. 12 shows a flowchart illustrating a method 1200 that supports enhancing reference signal transmission in CA in accordance with one or more aspects of the present disclosure. The operations of the method 1200 may be implemented by a UE or its components as described herein. For example, the operations of the method 1200 may be performed by a UE 115 as described with reference to FIGS. 1 through 11. In some aspects, a UE may execute a set of instructions to control the functional elements of the UE to perform the described functions. Additionally, or alternatively, the UE may perform aspects of the described functions using special-purpose hardware.

At 1205, the method may include receiving a first message that includes information indicative of an inter-band CA configuration that identifies a set of cells for communication by the network node. The operations of 1205 may be performed in accordance with examples as disclosed herein. In some aspects, aspects of the operations of 1205 may be performed by a CA configuration component 1025 as described with reference to FIG. 10.

At 1210, the method may include receiving a synchronization signal on a first cell of the set of cells via a wireless channel having a first set of channel properties. The operations of 1210 may be performed in accordance with examples as disclosed herein. In some aspects, aspects of the operations of 1210 may be performed by a synchronization signal receiving component 1030 as described with reference to FIG. 10.

At 1215, the method may include receiving, based on a first set of QCL parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals. The operations of 1215 may be performed in accordance with examples as disclosed herein. In some aspects, aspects of the operations of 1215 may be performed by a first QCL source receiving component 1035 as described with reference to FIG. 10.

Figure 13:
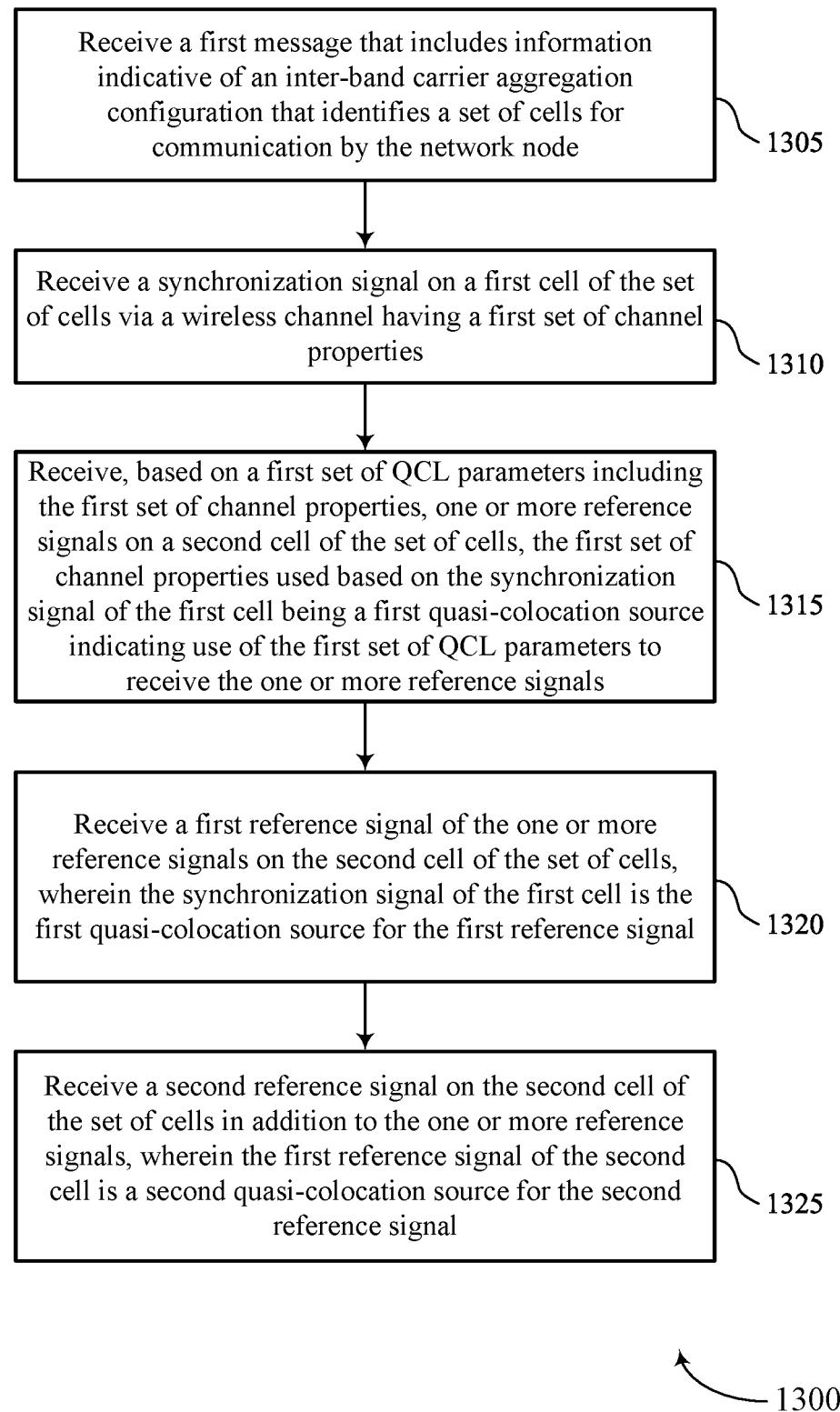

FIG. 13 shows a flowchart illustrating a method 1300 that supports enhancing reference signal transmission in CA in accordance with one or more aspects of the present disclosure. The operations of the method 1300 may be implemented by a UE or its components as described herein. For example, the operations of the method 1300 may be performed by a UE 115 as described with reference to FIGS. 1 through 11. In some aspects, a UE may execute a set of instructions to control the functional elements of the UE to perform the described functions. Additionally, or alternatively, the UE may perform aspects of the described functions using special-purpose hardware.

At 1305, the method may include receiving a first message that includes information indicative of an inter-band CA configuration that identifies a set of cells for communication by the network node. The operations of 1305 may be performed in accordance with examples as disclosed herein. In some aspects, aspects of the operations of 1305 may be performed by a CA configuration component 1025 as described with reference to FIG. 10.

At 1310, the method may include receiving a synchronization signal on a first cell of the set of cells via a wireless channel having a first set of channel properties. The operations of 1310 may be performed in accordance with examples as disclosed herein. In some aspects, aspects of the operations of 1310 may be performed by a synchronization signal receiving component 1030 as described with reference to FIG. 10.

At 1315, the method may include receiving, based on a first set of QCL parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals. The operations of 1315 may be performed in accordance with examples as disclosed herein. In some aspects, aspects of the operations of 1315 may be performed by a first QCL source receiving component 1035 as described with reference to FIG. 10.

At 1320, the method may include receiving a first reference signal of the one or more reference signals on the second cell of the set of cells, where the synchronization signal of the first cell is the first QCL source indicating the use of the first set of QCL parameters for receiving the first reference signal. The operations of 1320 may be performed in accordance with examples as disclosed herein. In some aspects, aspects of the operations of 1320 may be performed by a first QCL source receiving component 1035 as described with reference to FIG. 10.

At 1325, the method may include receiving a second reference signal on the second cell of the set of cells in addition to the one or more reference signals, where the first reference signal of the second cell is a second QCL source indicating the use of a second set of QCL parameters for receiving the second reference signal. The operations of 1325 may be performed in accordance with examples as disclosed herein. In some aspects, aspects of the operations of 1325 may be performed by a second QCL source receiving component 1040 as described with reference to FIG. 10.

Figure 14:
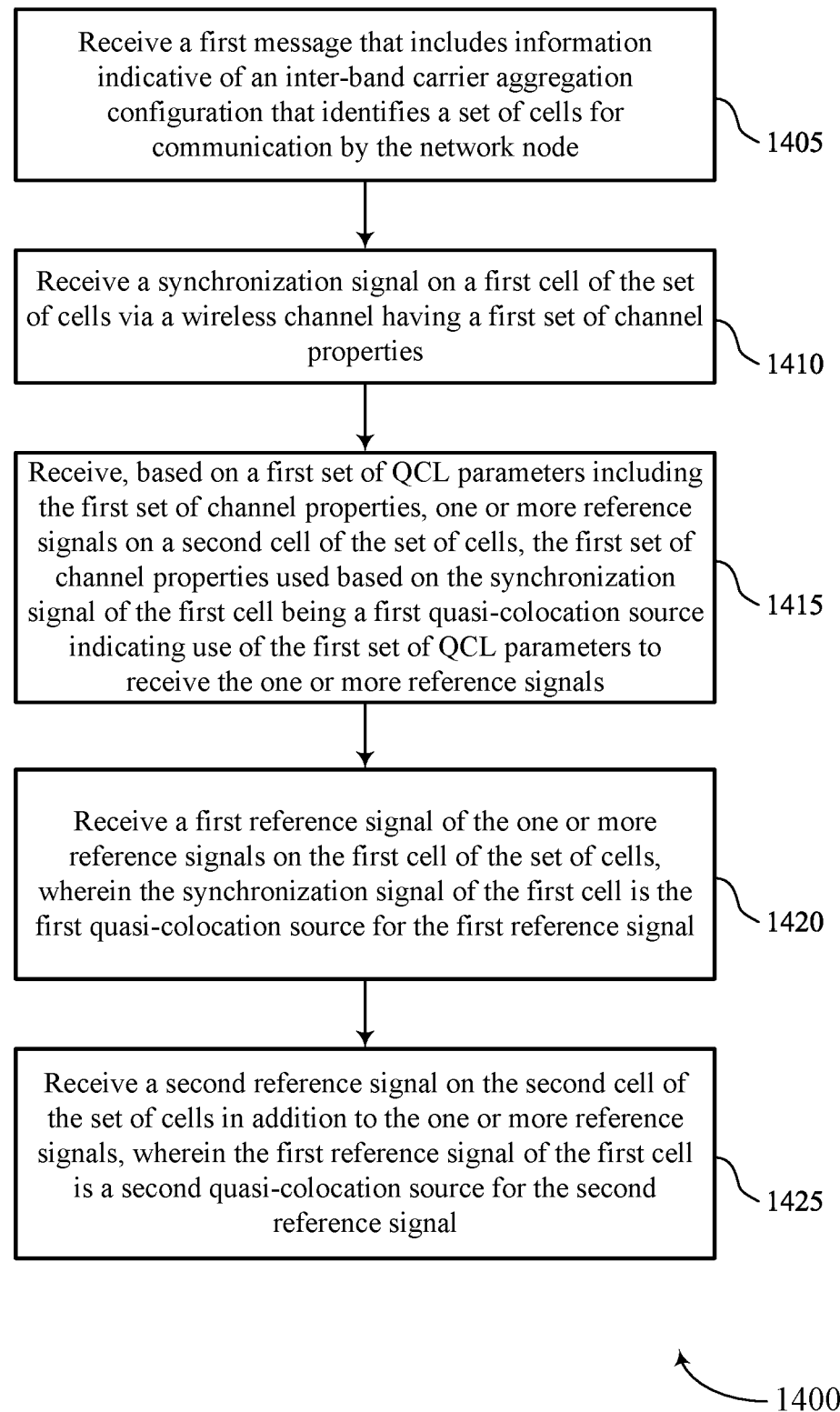

FIG. 14 shows a flowchart illustrating a method 1400 that supports enhancing reference signal transmission in CA in accordance with one or more aspects of the present disclosure. The operations of the method 1400 may be implemented by a UE or its components as described herein. For example, the operations of the method 1400 may be performed by a UE 115 as described with reference to FIGS. 1 through 11. In some aspects, a UE may execute a set of instructions to control the functional elements of the UE to perform the described functions. Additionally, or alternatively, the UE may perform aspects of the described functions using special-purpose hardware.

At 1405, the method may include receiving a first message that includes information indicative of an inter-band CA configuration that identifies a set of cells for communication by the network node. The operations of 1405 may be performed in accordance with examples as disclosed herein.

In some aspects, aspects of the operations of 1405 may be performed by a CA configuration component 1025 as described with reference to FIG. 10.

At 1410, the method may include receiving a synchronization signal on a first cell of the set of cells via a wireless channel having a first set of channel properties. The operations of 1410 may be performed in accordance with examples as disclosed herein. In some aspects, aspects of the operations of 1410 may be performed by a synchronization signal receiving component 1030 as described with reference to FIG. 10.

At 1415, the method may include receiving, based on a first set of QCL parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals. The operations of 1415 may be performed in accordance with examples as disclosed herein. In some aspects, aspects of the operations of 1415 may be performed by a first QCL source receiving component 1035 as described with reference to FIG. 10.

At 1420, the method may include receiving a first reference signal of the one or more reference signals on the first cell of the set of cells, where the synchronization signal of the first cell is the first QCL source indicating the use of the first set of QCL parameters for receiving the first reference signal. The operations of 1420 may be performed in accordance with examples as disclosed herein. In some aspects, aspects of the operations of 1420 may be performed by a first QCL source receiving component 1035 as described with reference to FIG. 10.

At 1425, the method may include receiving a second reference signal on the second cell of the set of cells in addition to the one or more reference signals, where the first reference signal of the first cell is a second QCL source indicating the use of a second set of QCL parameters for receiving the second reference signal. The operations of 1425 may be performed in accordance with examples as disclosed herein. In some aspects, aspects of the operations of 1425 may be performed by a second QCL source receiving component 1040 as described with reference to FIG. 10.

Figure 15:
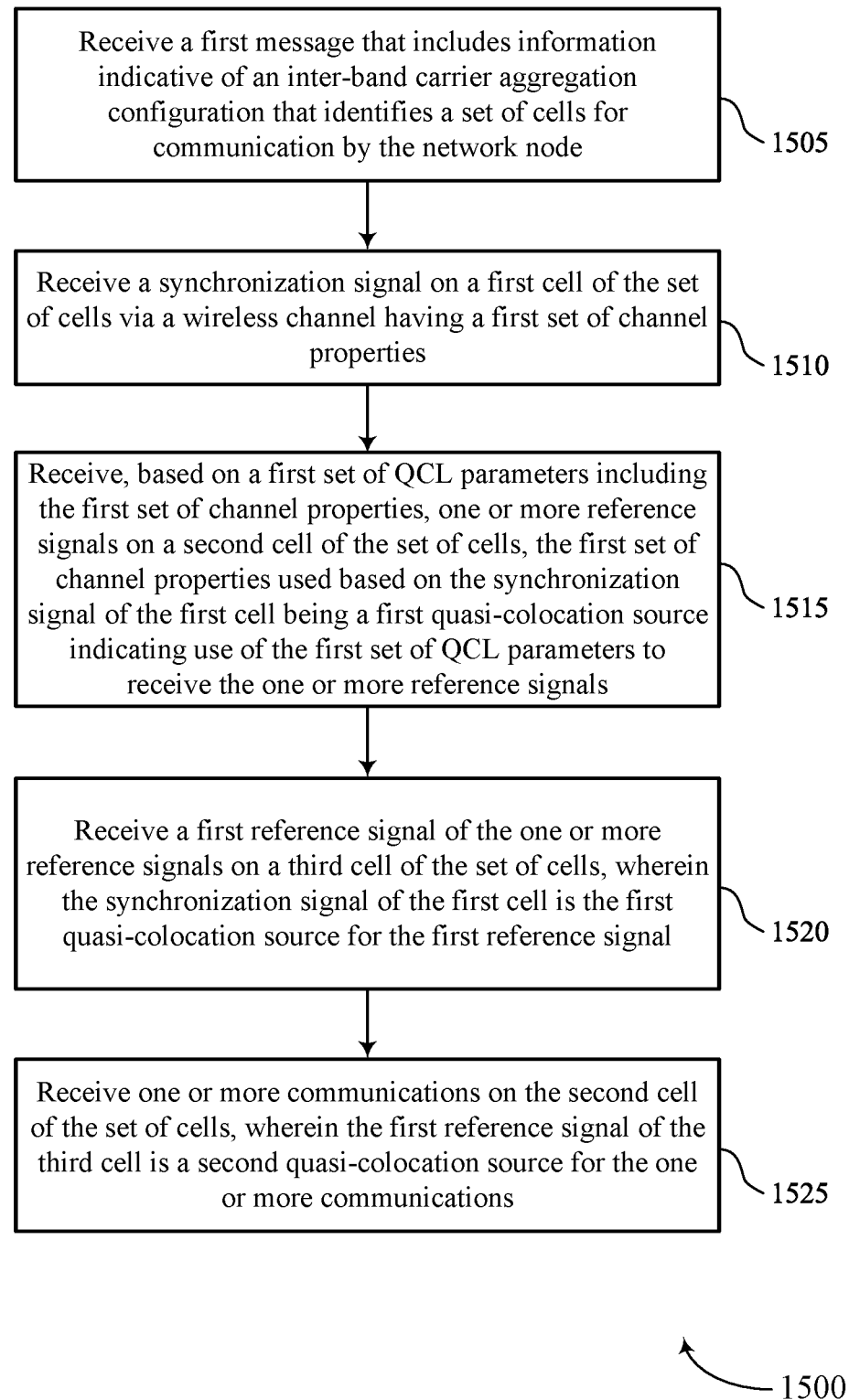

FIG. 15 shows a flowchart illustrating a method 1500 that supports enhancing reference signal transmission in CA in accordance with one or more aspects of the present disclosure. The operations of the method 1500 may be implemented by a UE or its components as described herein. For example, the operations of the method 1500 may be performed by a UE 115 as described with reference to FIGS. 1 through 11. In some aspects, a UE may execute a set of instructions to control the functional elements of the UE to perform the described functions. Additionally, or alternatively, the UE may perform aspects of the described functions using special-purpose hardware.

At 1505, the method may include receiving a first message that includes information indicative of an inter-band CA configuration that identifies a set of cells for communication by the network node. The operations of 1505 may be performed in accordance with examples as disclosed herein. In some aspects, aspects of the operations of 1505 may be performed by a CA configuration component 1025 as described with reference to FIG. 10.

At 1510, the method may include receiving a synchronization signal on a first cell of the set of cells via a wireless channel having a first set of channel properties. The operations of 1510 may be performed in accordance with examples as disclosed herein. In some aspects, aspects of the operations of 1510 may be performed by a synchronization signal receiving component 1030 as described with reference to FIG. 10.

At 1515, the method may include receiving, based on a first set of QCL parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals. The operations of 1515 may be performed in accordance with examples as disclosed herein. In some aspects, aspects of the operations of 1515 may be performed by a first QCL source receiving component 1035 as described with reference to FIG. 10.

At 1520, the method may include receiving a first reference signal of the one or more reference signals on a third cell of the set of cells, where the synchronization signal of the first cell is the first QCL source indicating the use of the first set of QCL parameters for receiving the first reference signal. The operations of 1520 may be performed in accordance with examples as disclosed herein. In some aspects, aspects of the operations of 1520 may be performed by a first QCL source receiving component 1035 as described with reference to FIG. 10.

At 1525, the method may include receiving one or more communications on the second cell of the set of cells, where the first reference signal of the third cell is a second QCL source indicating use of a second set of QCL parameters for receiving the one or more communications. The operations of 1525 may be performed in accordance with examples as disclosed herein. In some aspects, aspects of the operations of 1525 may be performed by a second QCL source receiving component 1040 as described with reference to FIG. 10.

Figure 16:
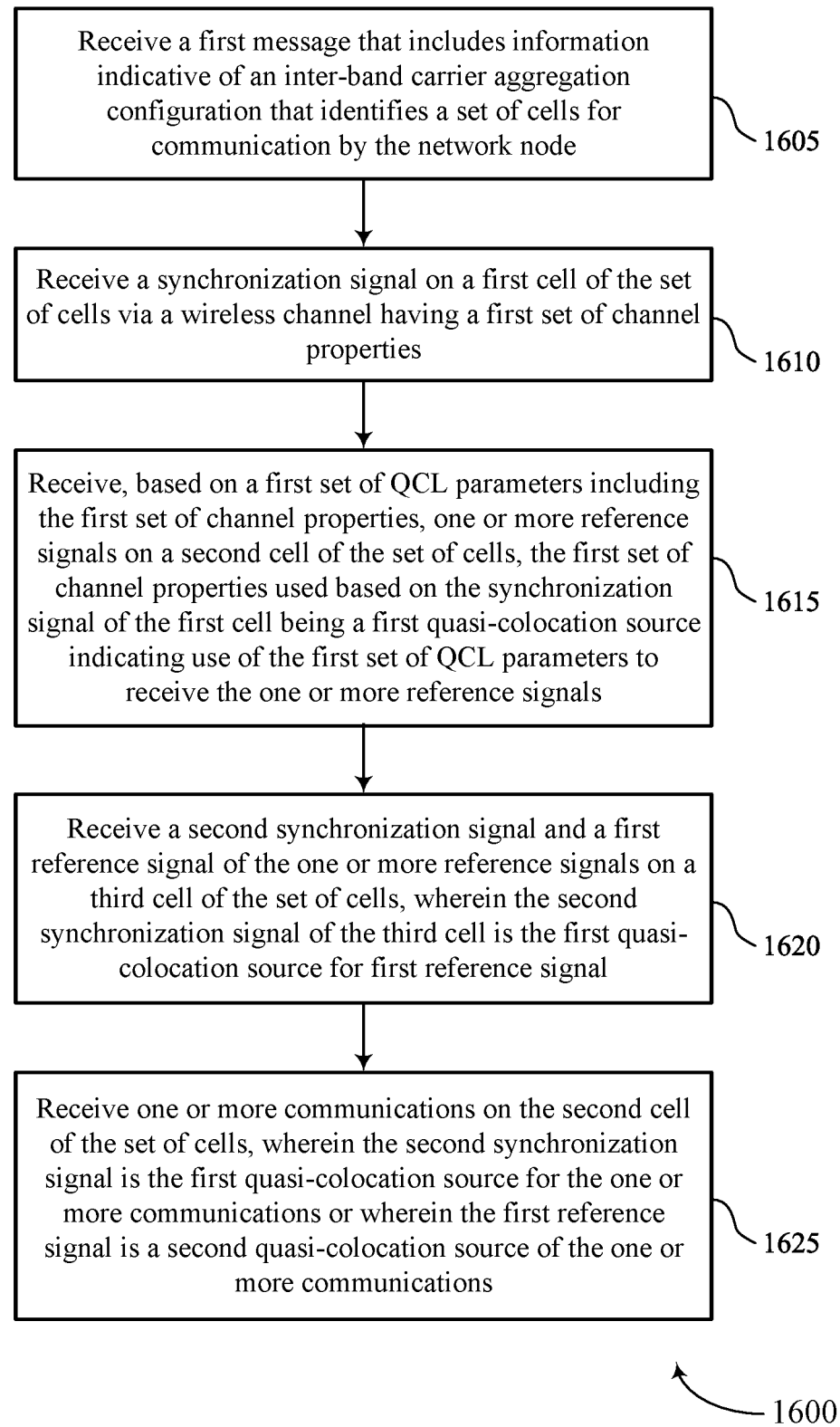

FIG. 16 shows a flowchart illustrating a method 1600 that supports enhancing reference signal transmission in CA in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some aspects, a UE may execute a set of instructions to control the functional elements of the UE to perform the described functions. Additionally, or alternatively, the UE may perform aspects of the described functions using special-purpose hardware.

At 1605, the method may include receiving a first message that includes information indicative of an inter-band CA configuration that identifies a set of cells for communication by the network node. The operations of 1605 may be performed in accordance with examples as disclosed herein. In some aspects, aspects of the operations of 1605 may be performed by a CA configuration component 1025 as described with reference to FIG. 10.

At 1610, the method may include receiving a synchronization signal on a first cell of the set of cells via a wireless channel having a first set of channel properties. The operations of 1610 may be performed in accordance with examples as disclosed herein. In some aspects, aspects of the operations of 1610 may be performed by a synchronization signal receiving component 1030 as described with reference to FIG. 10.

At 1615, the method may include receiving, based on a first set of QCL parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals. The operations of 1615 may be performed in accordance with examples as disclosed herein. In some aspects, aspects of the operations of 1615 may be performed by a first QCL source receiving component 1035 as described with reference to FIG. 10.

At 1620, the method may include receiving a second synchronization signal and a first reference signal of the one or more reference signals on a third cell of the set of cells, where the second synchronization signal of the third cell is the first QCL source for first reference signal. The operations of 1620 may be performed in accordance with examples as disclosed herein. In some aspects, aspects of the operations of 1620 may be performed by a first QCL source receiving component 1035 as described with reference to FIG. 10.

At 1625, the method may include receiving one or more communications on the second cell of the set of cells, where the second synchronization signal is the first QCL source indicating use of the first set of QCL parameters for receiving the one or more communications or where the first reference signal is a second QCL source indicating use of a second set of QCL parameters for receiving of the one or more communications. The operations of 1625 may be performed in accordance with examples as disclosed herein. In some aspects, aspects of the operations of 1625 may be performed by a communications receiving component 1045 as described with reference to FIG. 10.

The following provides an overview of aspects of the present disclosure:

Aspect 1: A method for wireless communications at a network node, comprising: receiving a first message that includes information indicative of an inter-band carrier aggregation configuration that identifies a set of cells for communication by the network node; receiving a synchronization signal on a first cell of the set of cells via a wireless channel having a first set of channel properties; and receiving, based on a first set of QCL parameters including the first set of channel properties, one or more reference signals on a second cell of the set of cells, the first set of QCL parameters used based on the synchronization signal of the first cell being a first QCL source indicating use of the first set of QCL parameters to receive the one or more reference signals.

Aspect 2: The method of aspect 1, further comprising: receiving a first reference signal of the one or more reference signals on the second cell of the set of cells, wherein the synchronization signal of the first cell is the first QCL source indicating use of the first set of QCL parameters for receiving the first reference signal; and receiving a second reference signal on the second cell of the set of cells in addition to the one or more reference signals, wherein the first reference signal of the second cell is a second QCL source indicating use of a second set of QCL parameters for receiving the second reference signal.

Aspect 3: The method of aspect 2, further comprising: receiving the first reference signal and the second reference signal of the one or more reference signals based on time and frequency synchronization information indicated by the synchronization signal of the first cell.

Aspect 4: The method of any of aspects 2 through 3, wherein the first set of QCL parameters, the second set of QCL parameters, or both, are associated with one or more Doppler shift parameters, one or more Doppler spread parameters, one or more average delay parameters, one or more delay spread parameters, one or more spatial receiver parameters, or any combination thereof.

Aspect 5: The method of any of aspects 1 through 4, further comprising: receiving a first reference signal of the one or more reference signals on the first cell of the set of cells, wherein the synchronization signal of the first cell is the first QCL source indicating use of the first set of QCL parameters for receiving the first reference signal; and receiving a second reference signal on the second cell of the set of cells in addition to the one or more reference signals, wherein the first reference signal of the first cell is a second QCL source indicating use of a second set of QCL parameters for receiving the second reference signal.

Aspect 6: The method of any of aspects 1 through 5, further comprising: receiving a first reference signal of the one or more reference signals on the second cell of the set of cells, wherein the synchronization signal of the first cell is the first QCL source indicating use of the first set of QCL parameters for receiving the first reference signal.

Aspect 7: The method of any of aspects 1 through 6, further comprising: receiving a first reference signal of the one or more reference signals on a third cell of the set of cells, wherein the synchronization signal of the first cell is the first QCL source indicating use of the first set of QCL parameters for receiving the first reference signal; and receiving one or more communications on the second cell of the set of cells, wherein the first reference signal of the third cell is a second QCL source indicating use of a second set of QCL parameters for receiving the one or more communications.

Aspect 8: The method of any of aspects 1 through 7, further comprising: receiving a second synchronization signal and a first reference signal of the one or more reference signals on a third cell of the set of cells, wherein the second synchronization signal of the third cell is the first QCL source indicating use of the first set of QCL parameters for receiving the first reference signal; and receiving one or more communications on the second cell of the set of cells, wherein the second synchronization signal is the first QCL source indicating use of the first set of QCL parameters for receiving the one or more communications or wherein the first reference signal is a second QCL source indicating use of a second set of QCL parameters for receiving the one or more communications.

Aspect 9: The method of any of aspects 1 through 8, further comprising: receiving the one or more communications on the second cell based on time and frequency synchronization information indicated by the first synchronization signal of the first cell; and receiving the first reference signal on the third cell based on additional time and frequency synchronization information indicated by the second synchronization signal of the second cell.

Aspect 10: A network node for wireless communications comprising: a memory; and at least one processor coupled to the memory wherein the at least one processor is configured to perform a method of any of aspects 1 through 9.

Aspect 11: A network node for wireless communication, comprising at least one means for performing a method of any of aspects 1 through 9.

Aspect 12: A non-transitory computer-readable medium having code stored thereon that, when executed by a network node, causes the network node to perform a method of any of aspects 1 through 9.

The methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network node for wireless communication, comprising:
at least one memory; and
at least one processor coupled to the at least one memory wherein the at least one processor is configured to:
receive a first message that includes information indicative of an inter-band carrier aggregation configuration that identifies a set of cells for communication by the network node;
receive a first synchronization signal on a first cell of the set of cells via a wireless channel having a first set of channel properties;
receive, based on use of a first set of quasi-colocation (QCL) parameters that include the first set of channel properties, one or more reference signals on a second cell of the set of cells, wherein use of the first set of QCL parameters is based on the first synchronization signal of the first cell being a first QCL source that indicates that the first set of QCL parameters are for reception of the one or more reference signals;
receive a second synchronization signal and a first reference signal of the one or more reference signals on a third cell of the set of cells, wherein the second synchronization signal of the third cell is the first QCL source that indicates that the first set of QCL parameters are for reception of the first reference signal; and
receive one or more communications on the second cell of the set of cells, wherein the second synchronization signal is the first QCL source that indicates that the first set of QCL parameters are for reception of the one or more communications, or wherein the first reference signal is a second QCL source that indicates that a second set of QCL parameters are for reception the one or more communications.

2. The network node of claim 1, wherein the at least one processor is configured to:
receive a second reference signal of the one or more reference signals on the second cell of the set of cells, wherein the first synchronization signal of the first cell is the first QCL source that indicates that the first set of QCL parameters are for reception of the second reference signal; and
receive a third reference signal on the second cell of the set of cells in addition to the one or more reference signals, wherein the second reference signal of the one or more reference signals on the second cell is a third QCL source that indicates that a third set of QCL parameters are for reception of the third reference signal.

3. The network node of claim 2, wherein the at least one processor is configured to:
receive the second reference signal and the third reference signal of the one or more reference signals based on time and frequency synchronization information indicated by the first synchronization signal of the first cell.

4. The network node of claim 2, wherein the first set of QCL parameters, the second set of QCL parameters, the third set of QCL parameters, or any combination thereof, are associated with one or more Doppler shift parameters, one or more Doppler spread parameters, one or more average delay parameters, one or more delay spread parameters, one or more spatial receiver parameters, or any combination thereof.

5. The network node of claim 1, wherein the at least one processor is configured to:
receive a second reference signal of the one or more reference signals on the first cell of the set of cells, wherein the first synchronization signal of the first cell is the first QCL source that indicates that the first set of QCL parameters are for reception of the second reference signal; and
receive a third reference signal on the second cell of the set of cells in addition to the one or more reference signals, wherein the second reference signal of the first cell is a third QCL source that indicates that a third set of QCL parameters are for reception of the second reference signal.

6. The network node of claim 5, wherein the at least one processor is configured to:
receive the second reference signal and the third reference signal of the one or more reference signals on the second cell based on time and frequency synchronization information indicated by the first synchronization signal of the first cell.

7. The network node of claim 5, wherein the first set of QCL parameters, the second set of QCL parameters, the third set of QCL parameters, or any combination thereof are associated with one or more Doppler shift parameters, one or more Doppler spread parameters, one or more average delay parameters, one or more delay spread parameters, one or more spatial receiver parameters, or any combination thereof.

8. The network node of claim 1, wherein the at least one processor is configured to:
receive a second reference signal of the one or more reference signals on the second cell of the set of cells, wherein the first synchronization signal of the first cell is the first QCL source that indicates that the first set of QCL parameters are for reception of the second reference signal.

9. The network node of claim 8, wherein the at least one processor is configured to:
receive the second reference signal of the one or more reference signals on the second cell based on time and frequency synchronization information indicated by the first synchronization signal of the first cell.

10. The network node of claim 8, wherein the first set of QCL parameters are associated with one or more Doppler shift parameters, one or more Doppler spread parameters, one or more average delay parameters, one or more delay spread parameters, one or more spatial receiver parameters, or any combination thereof.

11. The network node of claim 1, wherein the at least one processor is configured to:
receive a second reference signal of the one or more reference signals on the third cell of the set of cells, wherein the first synchronization signal of the first cell is the first QCL source that indicates that the first set of QCL parameters are for reception of the second reference signal, and wherein, to receive the one or more communications, the at least one processor is configured to:
receive the one or more communications on the second cell of the set of cells, wherein the second reference signal of the third cell is a third QCL source that indicates that a third set of QCL parameters are for reception of the one or more communications.

12. The network node of claim 11, wherein the at least one processor is configured to:
receive the second reference signal on the third cell and the one or more communications on the second cell based on time and frequency synchronization information indicated by the first synchronization signal of the first cell.

13. The network node of claim 11, wherein the first set of QCL parameters, the second set of QCL parameters, the third set of QCL parameters, or any combination thereof are associated with one or more Doppler shift parameters, one or more Doppler spread parameters, one or more average delay parameters, one or more delay spread parameters, one or more spatial receiver parameters, or any combination thereof.

14. The network node of claim 1, wherein the at least one processor is configured to:
receive the one or more communications on the second cell based on time and frequency synchronization information indicated by the first synchronization signal of the first cell; and
receive the first reference signal on the third cell based on additional time and frequency synchronization information indicated by the second synchronization signal of the second cell.

15. The network node of claim 1, wherein the first set of QCL parameters, the second set of QCL parameters, or both, are associated with one or more Doppler shift parameters, one or more Doppler spread parameters, one or more average delay parameters, one or more delay spread parameters, one or more spatial receiver parameters, or any combination thereof.

16. The network node of claim 1, wherein the first cell, the second cell, the third cell, or any combination thereof, are aligned in time in accordance with a threshold receive timing difference.

17. The network node of claim 1, wherein the first cell, the second cell, the third cell, or any combination thereof, comprise a combination of a primary cell and secondary cells that are co-located and that occupy different frequency bands of the inter-band carrier aggregation configuration.

18. The network node of claim 1, wherein the one or more reference signals comprise a periodic channel state information reference signal (CSI-RS) for tracking or an aperiodic CSI-RS for tracking, or both.

19. A method for wireless communications at a network node, comprising:
receiving a first message that includes information indicative of an inter-band carrier aggregation configuration that identifies a set of cells for communication by the network node;
receiving a first synchronization signal on a first cell of the set of cells via a wireless channel having a first set of channel properties;
receiving, based on use of a first set of quasi-colocation (QCL) parameters that include the first set of channel properties, one or more reference signals on a second cell of the set of cells, wherein use of the first set of QCL parameters is based on the first synchronization signal of the first cell being a first QCL source that indicates that the first set of QCL parameters are for reception of the one or more reference signals;
receiving a second synchronization signal and a first reference signal of the one or more reference signals on a third cell of the set of cells, wherein the second synchronization signal of the third cell is the first QCL source that indicates that the first set of QCL parameters are for reception of the first reference signal; and
receiving one or more communications on the second cell of the set of cells, wherein the second synchronization signal is the first QCL source that indicates that the first set of QCL parameters are for reception of the one or more communications, or wherein the first reference signal is a second QCL source indicating use of a second set of QCL parameters to receive the one or more communications.

20. The method of claim 19, further comprising:
receiving a second reference signal of the one or more reference signals on the second cell of the set of cells, wherein the first synchronization signal of the first cell is the first QCL source that indicates that the first set of QCL parameters are for reception of the second reference signal; and
receiving a third reference signal on the second cell of the set of cells in addition to the one or more reference signals, wherein the second reference signal of the one or more reference signals on the second cell is a third QCL source that indicates that a third set of QCL parameters are for reception of the third reference signal.

21. The method of claim 20, further comprising:
receiving the second reference signal and the third reference signal of the one or more reference signals based on time and frequency synchronization information indicated by the first synchronization signal of the first cell.

22. The method of claim 20, wherein the first set of QCL parameters, the second set of QCL parameters, the third set of QCL parameters, or any combination thereof, are associated with one or more Doppler shift parameters, one or more Doppler spread parameters, one or more average delay parameters, one or more delay spread parameters, one or more spatial receiver parameters, or any combination thereof.

23. The method of claim 19, further comprising:
receiving a second reference signal of the one or more reference signals on the first cell of the set of cells, wherein the first synchronization signal of the first cell is the first QCL source that indicates that the first set of QCL parameters are for reception of the second reference signal; and
receiving a third reference signal on the second cell of the set of cells in addition to the one or more reference signals, wherein the second reference signal of the first cell is a third QCL source that indicates that a third set of QCL parameters are for reception of the second reference signal.

24. The method of claim 19, further comprising:
receiving a second reference signal of the one or more reference signals on the second cell of the set of cells, wherein the first synchronization signal of the first cell is the first QCL source that indicates that the first set of QCL parameters are for reception of the second reference signal.

25. The method of claim 19, further comprising:
receiving a second reference signal of the one or more reference signals on the third cell of the set of cells, wherein the first synchronization signal of the first cell is the first QCL source that indicates that the first set of QCL parameters are for reception of the second reference signal, and wherein receiving the one or more communications comprises:
receiving one or more communications on the second cell of the set of cells, wherein the second reference signal of the third cell is a third QCL source that indicates that a third set of QCL parameters are for reception of the one or more communications.

26. The method of claim 19, further comprising:
receiving the one or more communications on the second cell based on time and frequency synchronization information indicated by the first synchronization signal of the first cell; and
receiving the first reference signal on the third cell based on additional time and frequency synchronization information indicated by the second synchronization signal of the second cell.

27. A network node for wireless communication, comprising:
means for receiving a first message that includes information indicative of an inter-band carrier aggregation configuration that identifies a set of cells for communication by the network node;
means for receiving a first synchronization signal on a first cell of the set of cells via a wireless channel having a first set of channel properties;
means for receiving, based on use of a first set of quasi-colocation (QCL) parameters that include the first set of channel properties, one or more reference signals on a second cell of the set of cells, wherein use of the first set of QCL parameters is based on the first synchronization signal of the first cell being a first QCL source that indicates that the first set of QCL parameters are for reception of the one or more reference signals;
means for receiving a second synchronization signal and a first reference signal of the one or more reference signals on a third cell of the set of cells, wherein the second synchronization signal of the third cell is the first QCL source that indicates that the first set of QCL parameters are for reception of the first reference signal; and
means for receiving one or more communications on the second cell of the set of cells, wherein the second synchronization signal is the first QCL source that indicates that the first set of QCL parameters are for reception of the one or more communications, or wherein the first reference signal is a second QCL source indicating use of a second set of QCL parameters to receive the one or more communications.

28. A non-transitory computer-readable medium having code stored thereon that, when executed by a network node, causes the network node to:
receive a first message that includes information indicative of an inter-band carrier aggregation configuration that identifies a set of cells for communication by the network node;
receive a first synchronization signal on a first cell of the set of cells via a wireless channel having a first set of channel properties;
receive, based on use of a first set of quasi-colocation (QCL) parameters that include the first set of channel properties, one or more reference signals on a second cell of the set of cells, wherein use of the first set of QCL parameters is based on the first synchronization signal of the first cell being a first QCL source that indicates that the first set of QCL parameters are for reception of the one or more reference signals;
receive a second synchronization signal and a first reference signal of the one or more reference signals on a third cell of the set of cells, wherein the second synchronization signal of the third cell is the first QCL source that indicates that the first set of QCL parameters are for reception of the first reference signal; and
receive one or more communications on the second cell of the set of cells, wherein the second synchronization signal is the first QCL source that indicates that the first set of QCL parameters are for reception of the one or more communications, or wherein the first reference signal is a second QCL source indicating use of a second set of QCL parameters to receive the one or more communications.

\* \* \* \* \*